United States Patent
Howie et al.

(10) Patent No.: US 10,990,915 B2
(45) Date of Patent: Apr. 27, 2021

(54) NEAR REAL-TIME SYSTEM OR NETWORK INCIDENT DETECTION

(71) Applicant: Bank of America Corporation, Charlotte, NC (US)

(72) Inventors: Charles C. Howie, Golden, CO (US); DeAundra K. Glover, Waxhaw, NC (US); Jesse Price, Louisville, KY (US); Aaron Kephart, Denver, NC (US)

(73) Assignee: Bank of America Corporation, Charlotte, NC (US)

( * ) Notice: Subject to any disclaimer, the term of this patent is extended or adjusted under 35 U.S.C. 154(b) by 1142 days.

(21) Appl. No.: 15/406,194

(22) Filed: Jan. 13, 2017

(65) Prior Publication Data

US 2018/0204154 A1    Jul. 19, 2018

(51) Int. Cl.
*G06Q 10/06* (2012.01)
*G06N 20/00* (2019.01)
*H04L 12/24* (2006.01)

(52) U.S. Cl.
CPC ......... *G06Q 10/0635* (2013.01); *G06N 20/00* (2019.01); *H04L 41/0631* (2013.01); *H04L 41/142* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 8,266,072 B2 | 9/2012 | Grace et al. | |
| 8,417,553 B2 | 4/2013 | Putra et al. | |

(Continued)

FOREIGN PATENT DOCUMENTS

| | | | | |
|---|---|---|---|---|
| AU | 2017203826 B2 | * | 7/2018 | ........... G06F 40/263 |
| EP | 3139320 A1 | * | 3/2017 | .......... G06F 11/3684 |
| EP | 3319004 A1 | * | 5/2018 | ......... H04L 63/1416 |

OTHER PUBLICATIONS

Silva, Sara, Rúben Pereira, and Ricardo Ribeiro. "Machine learning in incident categorization automation." 2018 13th Iberian Conference on Information Systems and Technologies (CISTI). IEEE, 2018. (Year: 2018).*

(Continued)

*Primary Examiner* — Matthew S Gart
*Assistant Examiner* — Derick J Holzmacher
(74) *Attorney, Agent, or Firm* — Banner & Witcoff, Ltd.; Michael A. Springs

(57) ABSTRACT

Systems and arrangements for determining whether a scheduled modification of a system, or the like, is a likely cause of an incident are provided. Historical data related to previous incidents may be received and analyzed to identify incidents having a significant business impact and the system, or the like, associated with those incidents. Scheduled modification data may be received and may include a system, or the like, for which a modification has occurred, and a time and date at which the modification is occurred. An incident may be received and the system, or the like associated with the incident may be identified and compared to systems, or the like, identified in the scheduled modification data. If there is a match, a determination may be made as to whether the incident occurred at a time and date of the scheduled modification. If so, the scheduled modification may be identified as a likely cause of the incident.

21 Claims, 31 Drawing Sheets

(56) References Cited

U.S. PATENT DOCUMENTS

| | | | |
|---|---|---|---|
| 8,589,196 B2 | 11/2013 | Grace et al. | |
| 8,732,840 B2 | 5/2014 | Howes et al. | |
| 8,776,241 B2 | 7/2014 | Zaitsev | |
| 8,935,153 B2 | 1/2015 | McKeeman et al. | |
| 9,165,250 B2 | 10/2015 | Froelich | |
| 9,369,481 B2 | 6/2016 | Howes et al. | |
| 9,392,003 B2 | 7/2016 | Amsler | |
| 9,582,408 B1* | 2/2017 | Jayaraman | G06Q 10/06 |
| 10,095,779 B2* | 10/2018 | Agarwal | G06N 7/005 |
| 10,628,250 B2* | 4/2020 | Chafle | G06F 11/079 |
| 2009/0313219 A1* | 12/2009 | Gupta | G06Q 10/10 |
| 2010/0274596 A1* | 10/2010 | Grace | G06Q 40/02 |
| | | | 705/7.15 |
| 2010/0318846 A1* | 12/2010 | Sailer | G06F 11/079 |
| | | | 714/26 |
| 2012/0210249 A1* | 8/2012 | Steincamp, II | G06Q 10/00 |
| | | | 715/752 |
| 2014/0006861 A1* | 1/2014 | Jain | G06N 5/022 |
| | | | 714/26 |
| 2014/0129536 A1* | 5/2014 | Anand | G06N 7/005 |
| | | | 707/706 |
| 2014/0351176 A1* | 11/2014 | Jan | G06N 5/048 |
| | | | 706/12 |
| 2015/0067140 A1* | 3/2015 | Branch | H04L 41/147 |
| | | | 709/224 |
| 2015/0288557 A1* | 10/2015 | Gates | G06F 11/3082 |
| | | | 714/37 |
| 2017/0103329 A1* | 4/2017 | Reddy | G06Q 30/016 |
| 2017/0178038 A1* | 6/2017 | Guven | G06Q 30/016 |
| 2017/0372231 A1* | 12/2017 | Ghatage | G06F 16/35 |

OTHER PUBLICATIONS

Sarnovsky, Martin, and Juraj Surma. "Predictive models for support of incident management process in IT service management." Acta Electrotechnica et Informatica 18.1 (2018): 57-62. (Year: 2018).*

Jan, Ea-Ee, et al. "A statistical machine learning approach for ticket mining in IT service delivery." 2013 IFIP/IEEE International Symposium on Integrated Network Management (IM 2013). IEEE, 2013. (Year: 2013).*

Mustapha, Aida, et al. "Machine Learning Supervised Analysis for Enhancing Incident Management Process." International Journal 8.1.1 (2020). (Year: 2020).*

* cited by examiner

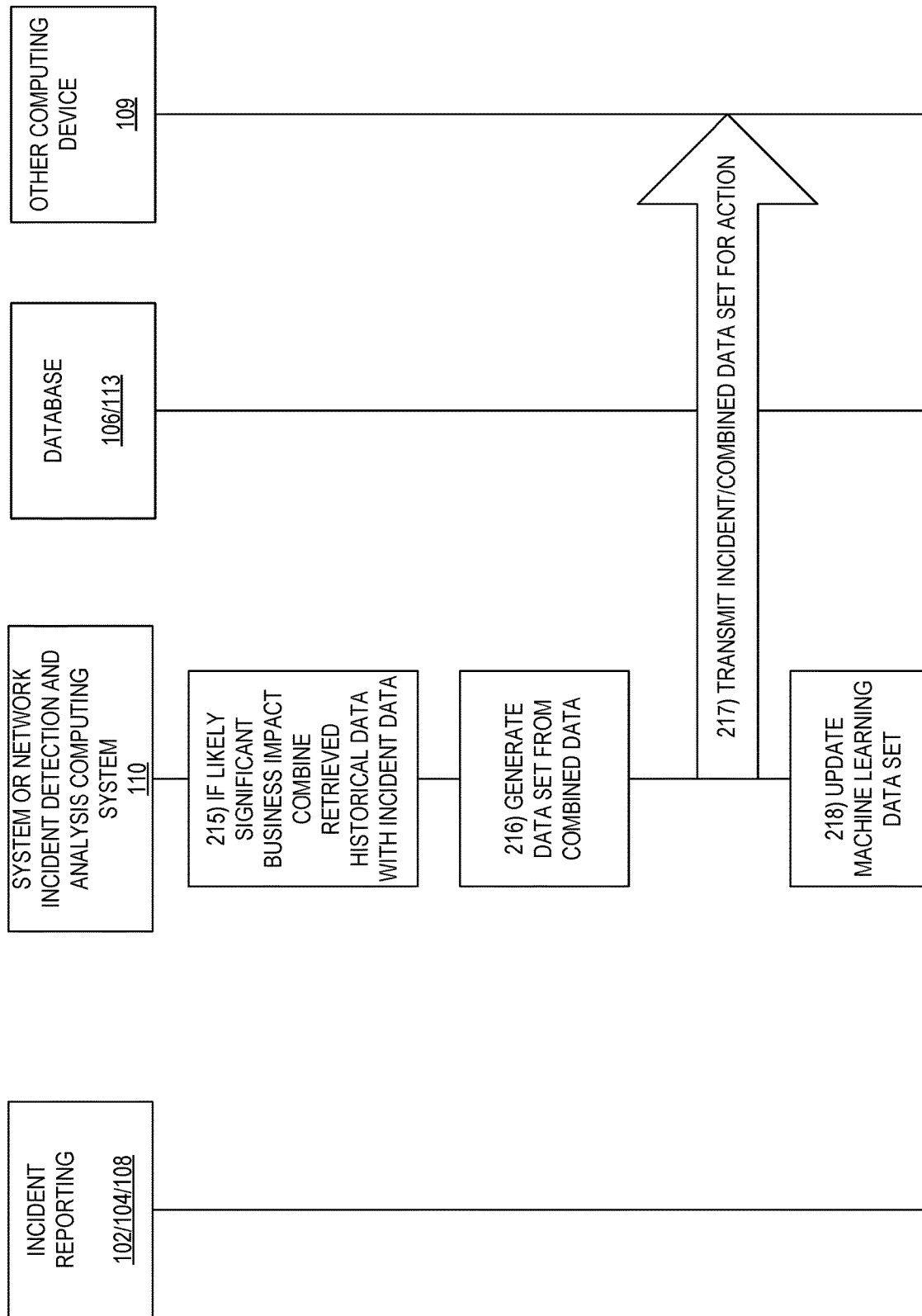

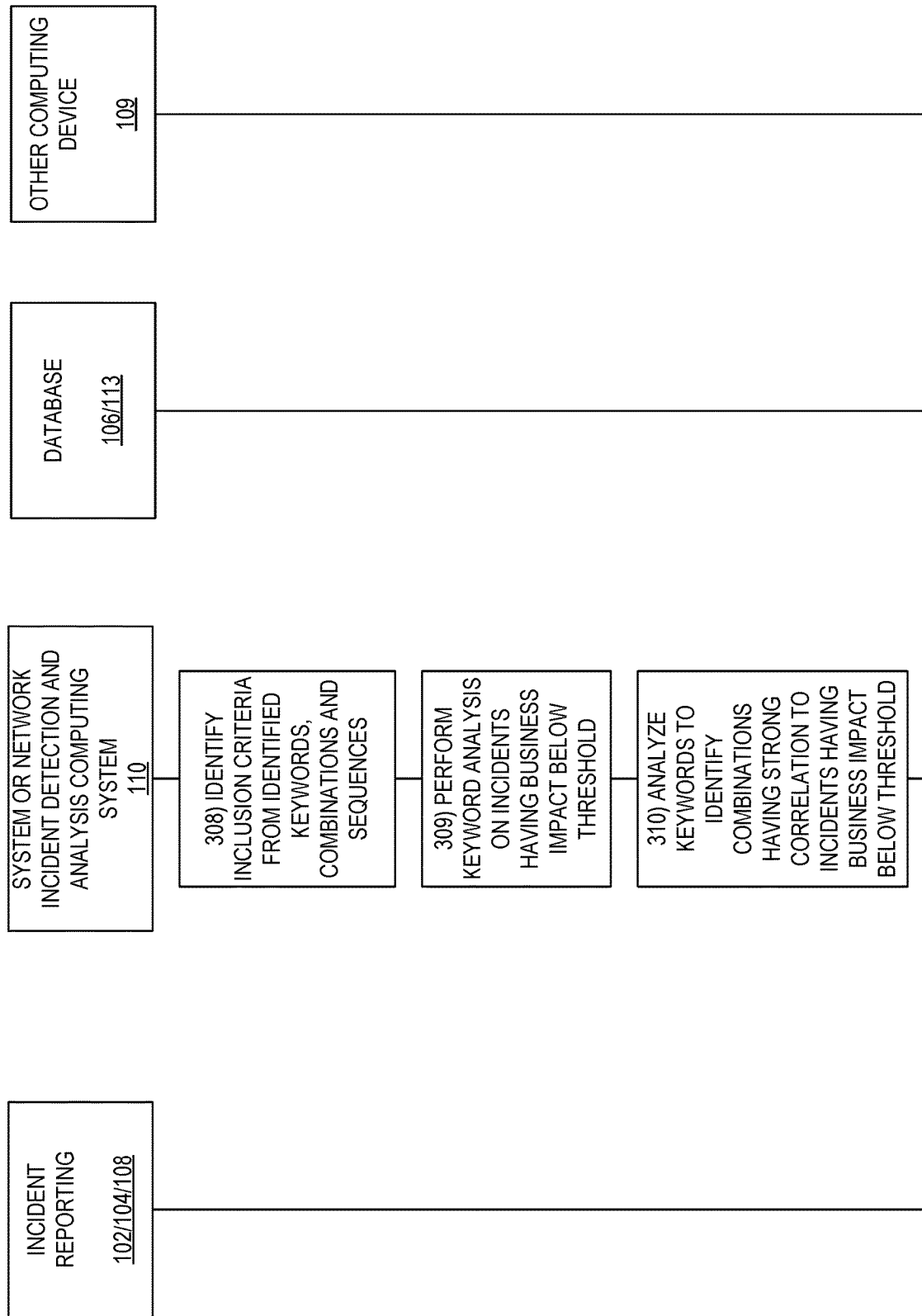

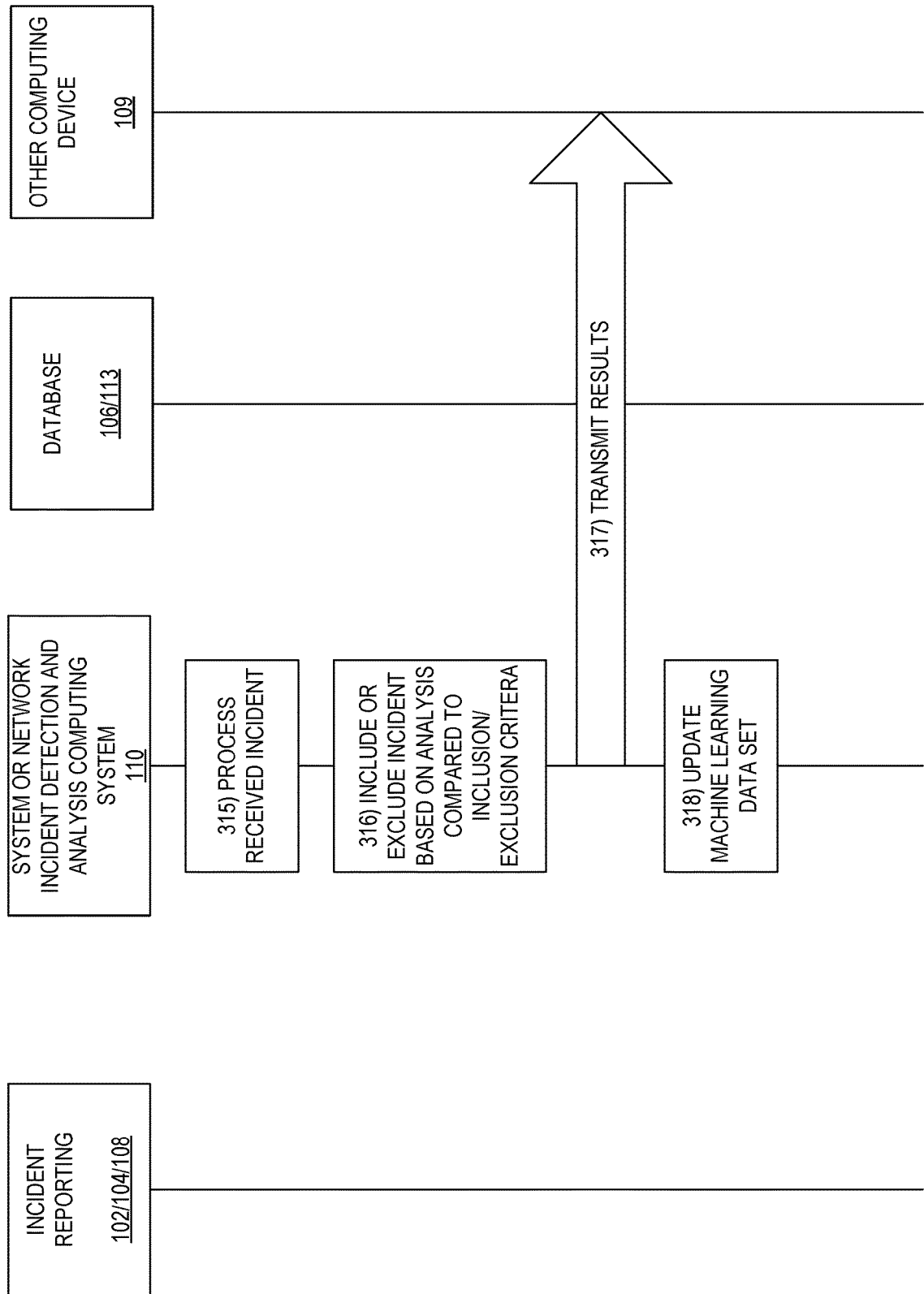

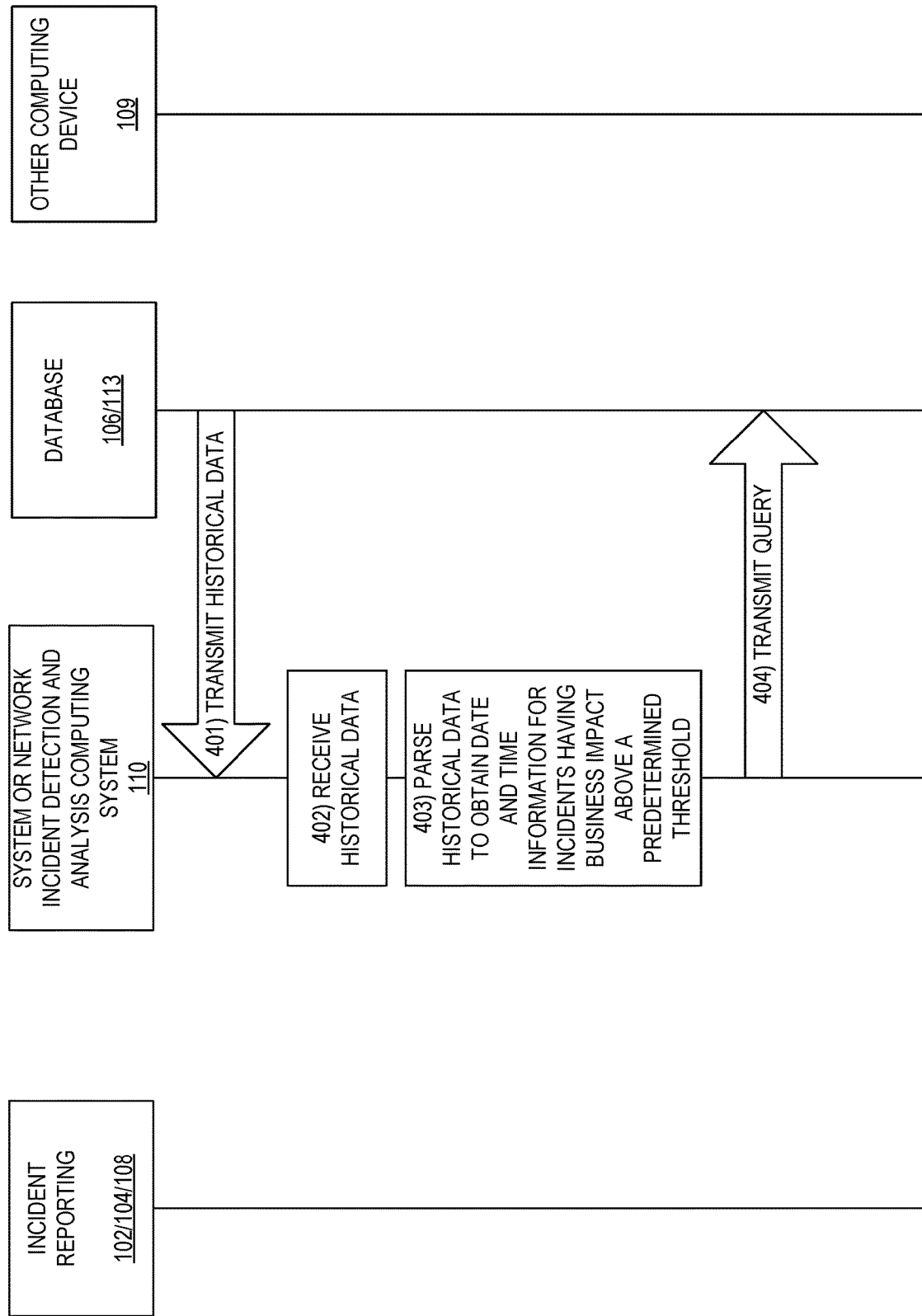

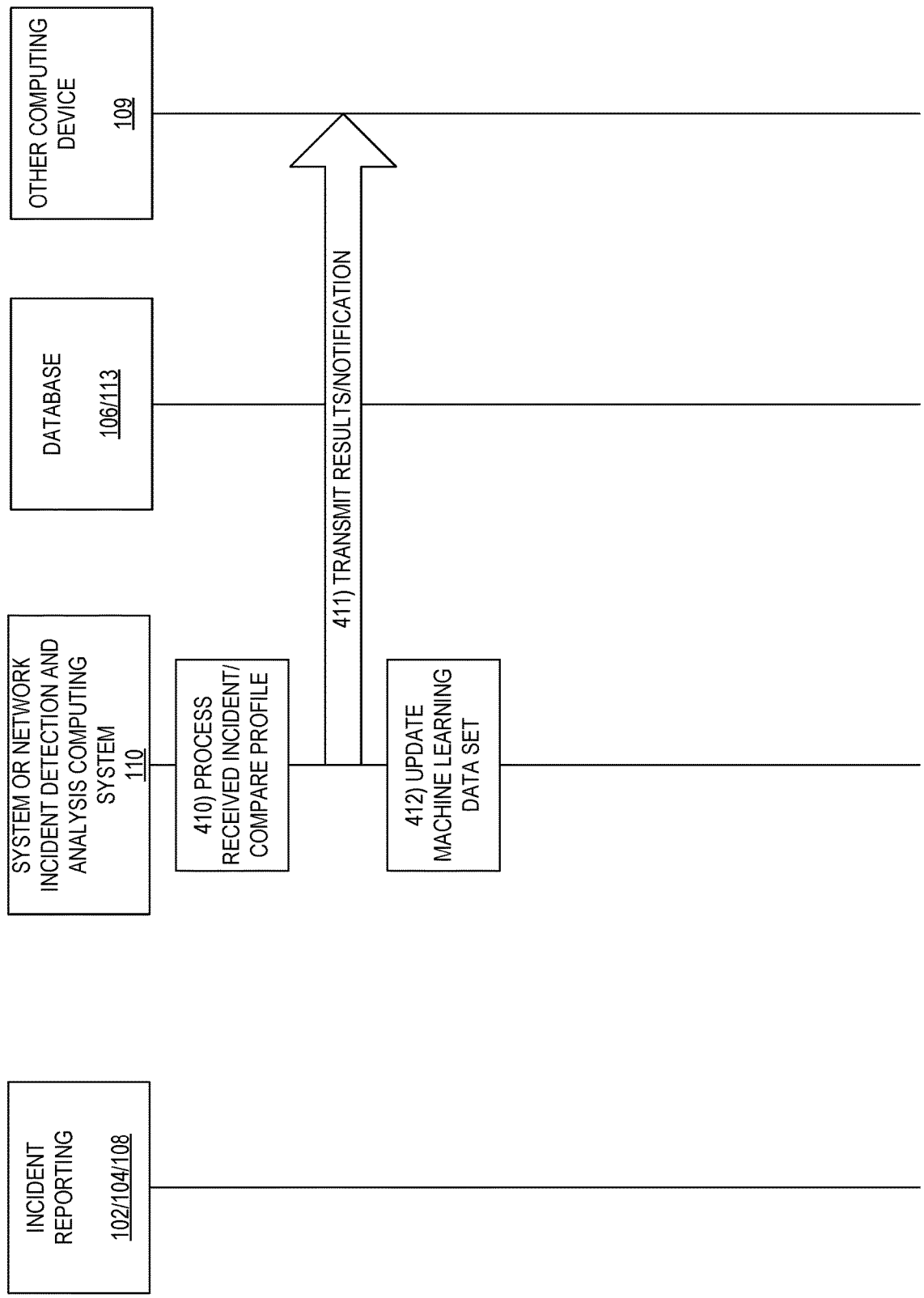

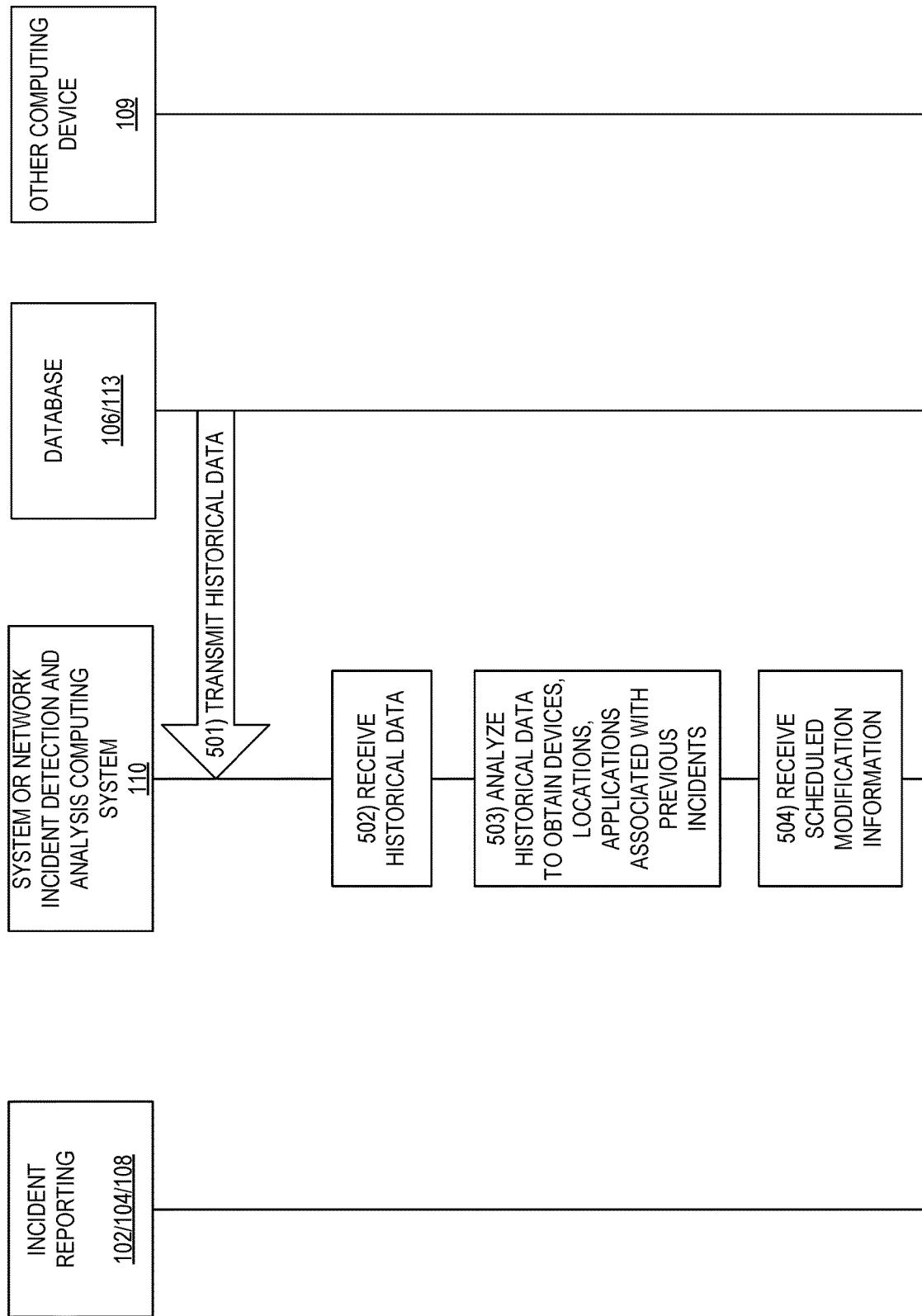

NEAR REAL-TIME SYSTEM OR NETWORK INCIDENT DETECTION

BACKGROUND

Aspects of the disclosure relate to computer hardware and software. In particular, one or more aspects of the disclosure generally relate to computer hardware and software for detecting system, application, network, or the like, incidents and, using machine learning to evaluate incidents to determine whether the incident is likely to have an impact above a predetermined threshold.

Large entities today implement hundreds or possibly thousands of different applications, systems, networks, devices, and the like, in various locations, to conduct business. As incidents occur, such as failures of the applications, systems, networks, devices, or the like, interruptions in one or more services can be costly to the entity. For instance, lost customer interaction and lost person hours can be detrimental to an entity's business.

Further, resources to address incidents that occur may be limited. Accordingly, it is advantageous to prioritize available resources (e.g., funding, personnel, or the like) to incidents that are likely to have a significant business impact. Thus, systems and arrangements for proactively identifying, in real-time or near real-time, incidents that may have a significant business impact would be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to computer systems and arrangements for identifying scheduled modifications of one or more applications, systems, networks, or the like, and determining, using machine learning, whether the scheduled modification is likely to be a cause of a detected or received incident. In some examples, historical data related to previously occurring incidents may be received and analyzed. Each incident may be evaluated to identify incidents having a significant business impact and the device, system, application, network, or the like, associated with those incidents.

In some examples, scheduled modification data may be received. The scheduled modification data may include a system, network, application, device, or the like, for which a modification is scheduled or has occurred, as well as a time and date at which the modification is scheduled or occurred.

An incident may be detected or received and the device, system, network, application, or the like associated with the incident may be identified. In some examples, the device, system, network, application, or the like, may be compared to devices, systems, networks, applications, or the like, identified in the scheduled modification data. If there is a match, a determination may be made as to whether the incident occurred at or near a time and date of the scheduled modification. If so, the scheduled modification may be identified as a likely cause of the incident and a notification may be transmitted to one or more computing devices.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for pre-processing data and evaluating incidents according to one or more aspects described herein;

FIGS. 3A-3E depict an illustrative event sequence for performing a textual analysis and evaluating incidents according to one or more aspects described herein;

FIGS. 4A-4C depict an illustrative event sequence for performing a temporal analysis and evaluating incidents according to one or more aspects described herein;

FIGS. 5A-5D depict an illustrative event sequence for performing a change management evaluation and evaluating incidents according to one or more aspects described herein;

DETAILED DESCRIPTION

Figure 1A:
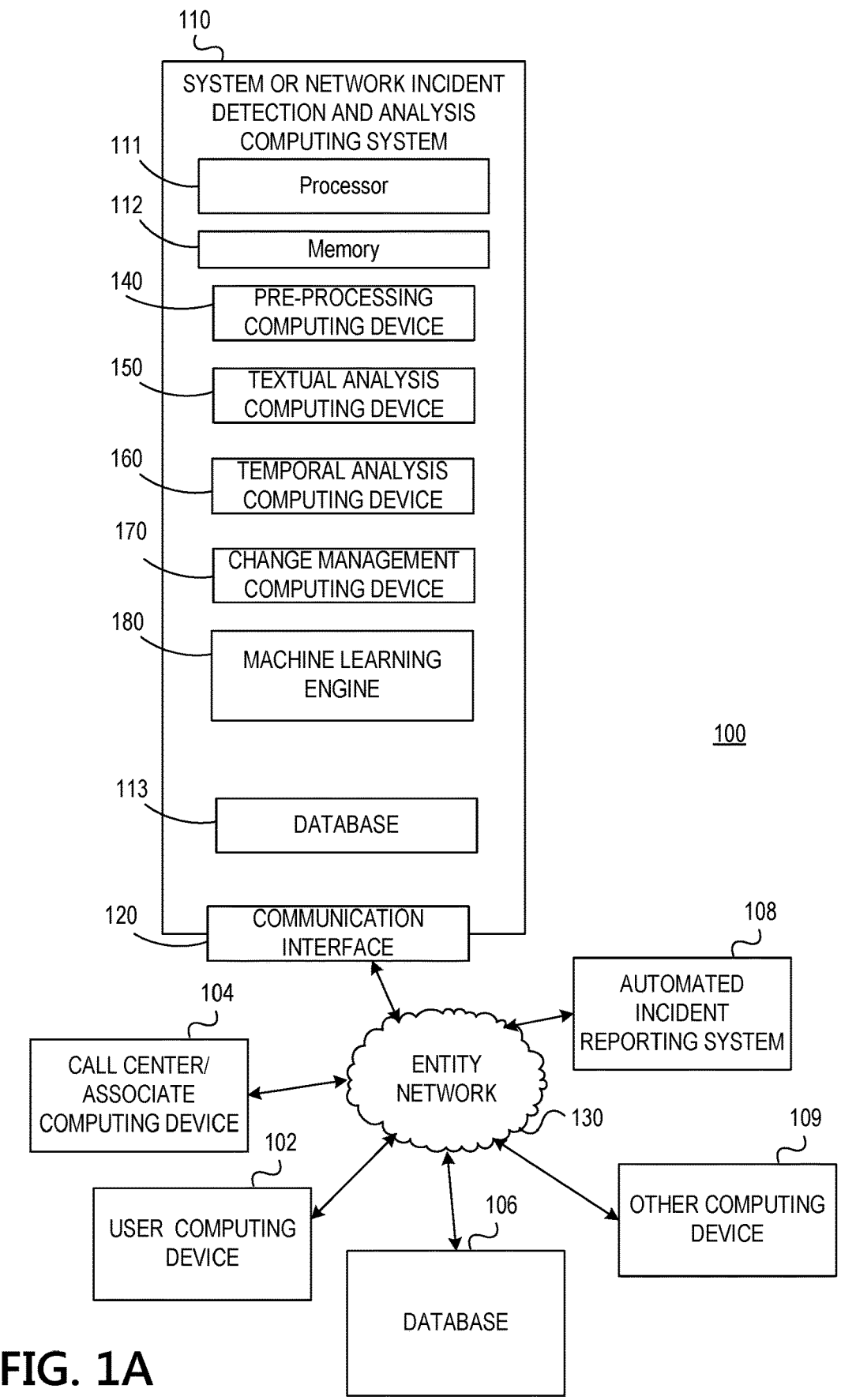
FIGS. 1A-1E depict an illustrative system or network incident detection and analysis computing system and associated components according to one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, large entities often have hundreds or even thousands of computing systems, networks, applications, devices, and the like, often operating or controlling operations in multiple locations, in order to aid in many business functions. As incidents occur, such as system or network failures, application functionality failures or issues, and the like, the incidents must be evaluated to understand a potential impact of the incident and assign appropriate resources to address the incident. For example, an incident to a system or application that is used 24 hours/day by hundreds or thousands of people, such as an online banking application or system supporting the application, may have a much greater impact on the business of the entity than an incident impacting a single server used by only a few people to control operations of a small segment of the business. Accordingly, understanding a potential impact of an incident may aid in properly prioritizing incidents, assigning resources including financial resources, person hours, and the like. However, conventional systems often require manual evaluation each incident and often do not have enough information to accurately determine a potential impact of the incident. For example, in some arrangements, over 600,000 incidents may occur in a single month. In order to evaluate the incidents and understand the potential impact, technically qualified users may manually evaluate each incident. This process may be time consuming, inefficient, and inaccurate. This conventional process may also make quickly identifying significant business impact incidents difficult, which may be costly for the entity.

Accordingly, aspects described herein are directed to using machine learning to evaluate historical data associated with a plurality of incidents that previously occurred to identify incidents likely to cause a significant business impact. One or more machine learning data sets may be generated and used to evaluate incoming incidents (e.g., newly detected or received incidents) in order to evaluate a potential impact, allocate resources, and the like. In some examples, textual analysis and/or temporal analysis may be used to evaluate incoming incidents, as will be discussed more fully herein. In still other arrangements, scheduled modification data for one or more systems, networks, devices, applications, or the like, may be received and used to determine a cause of an incident, as will be discussed more fully below.

Such arrangements using machine learning may aid in more efficiently processing incoming incidents and may lead to more accurate results. Thus, the entity may be able to efficiently, accurately and quickly identify incidents likely to cause a significant business impact and prioritize resources to address those incidents.

These and various other arrangements will be discussed more fully herein.

FIG. 1A depicts an environment 100 including an illustrative computing system for detecting one or more incidents associated with an application, system, network, device, or the like. Incidents may include issues with a technical or operating environment, issues with an application (e.g., interactions or links that are no longer functioning, inability to open an application, or the like), failure of a system, application, network or device, and the like. Incidents may be reported via one or more devices or systems, as will be described more fully below. In addition, incidents may have varying degrees or magnitude of impact on a business associated with the system, application, network, device, or the like. Accordingly, quantifying the potential impact or magnitude of the potential impact, particularly as soon as possible after detecting the incident, may aid in mitigating impact, appropriately allocating resources, and the like, as will be discussed more fully below.

The environment 100 includes system or network incident detection and analysis computing system 110, which may include one or more processors 111, memory 112, and communication interface 120. A data bus may interconnect processor(s) 111, memory 112, and communication interface 120. Communication interface 120 may be a network interface configured to support communication between the system or network incident detection and analysis computing system 110 and one or more wired and/or wireless networks (e.g., network 130). As will be discussed more fully herein, although various aspects may refer to detecting incidents with a system or network, aspects and features described herein may be used with incidents related to applications, devices, and the like, without departing from the invention.

The system or network incident detection and analysis computing system 110 may include a plurality of computing devices. The plurality of computing devices may be separate physical computing devices or may be parts of a same physical computing device. Accordingly, in some examples, the system or network incident detection and analysis computing system 110 may be a single computing device with multiple components configured to perform the various functions described herein. In other examples, the system or network incident detection and analysis computing system 110 may be a system including a plurality of separate computing devices configured to perform the various functions described herein.

For instance, the system or network incident detection and analysis computing system 110 may include a pre-processing computing device 140 configured to perform one or more pre-processing functions associated with historical data in order to quickly and accurately determine a potential business impact of a detected incident in real-time or near real-time. The system or network incident detection and analysis computing system 110 may further include a textual analysis computing device 150 configured to perform one or more textual analysis functions on historical data to identify inclusion and exclusion criteria that may be used to determine a potential business impact of an incident in real-time or near real-time. The system or network incident detection and analysis computing system 110 may further include a temporal analysis computing device 160 configured to perform temporal analysis functions on historical data in order to identify significant dates, time periods, and the like, that may affect the business impact of a detected incident in real-time or near real-time. The system or network incident detection and analysis computing system 110 may further include a change management computing device 170 configured to identify scheduled modifications to various systems, networks, applications, devices, locations, and the like, and to determine whether a detected incident may have been caused by the scheduled modification in real-time or near real-time. The system or network incident detection and analysis computing system 110 may further include a machine learning engine 180 configured to interface with one or more computing devices 140, 150, 160, 170, to perform machine learning functions, generate machine learning data sets, and the like. These devices will be discussed more fully herein and, for example, with respect to FIGS. 1B-1E.

One or more computing or other devices or systems 102, 104, 108, 109 may be in communication with the system or network incident detection and analysis computing system 110 (e.g., via network 130). For instance the environment may include one or more systems or devices for detecting and/or reporting incidents. For example, automated incident reporting system 108 may interface with one or more systems to automatically detect a failure or other incident associated with a system, network, application, device, or the like. The automated incident reporting system 108 may receive incident data, such as time and date of incident, system, application, network, device, or the like, affected by the incident, and/or additional information. This information may be transmitted to the system or network incident detection and analysis computing system 110 for real-time or near real-time analysis to evaluate the incident and determine or quantify a potential business impact of the incident.

The environment 100 may further include a user computing device 102. The user computing device 102 may be any type of computing device (e.g., smartphone, mobile device, tablet, laptop, desktop, or the like) used by a customer or user to access one or more systems, networks, applications, devices, or the like, associated with a business entity (e.g., the entity operating or associated with the system or network incident detection and analysis computing system 110). For example, a user may attempt to access an online banking application via his or her smartphone. If the user should encounter any issues (e.g., failure of the application to open, failure of the application to operate properly, features that are not functioning, or the like) the user may report this incident (e.g., via an option provided on the online banking application) and the reported incident may be transmitted (e.g., via network 130) to the system or network incident detection and analysis computing system 110 for evaluation.

In some examples, incidents may be reported to a call center or other associate of the entity (e.g., a teller or banking associate at a financial institution branch, or the like). Accordingly, the call center or other associate may generate a record of the incident (e.g., a ticket) and request to rectify an associated issue via a call center/associate computing device 104.

The environment 100 may further include one or more other computing devices 109. The other computing devices may be computing devices associated with employees of the entity to whom one or more generated notifications may be transmitted (e.g., reporting an incident, status of an incident, magnitude of potential business impact, and the like). The notifications may be transmitted to the computing device 109 and displayed on a display of the computing device 109.

One or more databases 113, 106 may also be connected to or in communication with the system or network incident detection and analysis computing system 110. For instance, database 106 may be connected to the system or network incident detection and analysis computing system 110 via one or more networks, such as network 130. The databases 113, 106 may be used to store historical incident data (e.g., previous incidents that have been addressed), as well as information about each incident, such as an application, system, network, device, or the like, affected by the incident, a magnitude of a business impact associated with the incident (e.g., as determined after the incident occurred and was rectified), time and date information associated with the incident, and the like. This information may be used by the system or network incident detection and analysis computing system 110 to generate criteria that may aid in quantifying or predicting an expected business impact associated with an ongoing incident in real-time or near real-time, in order to effectively allocate resources to remedy various incidents, and the like.

The computing devices shown in FIG. 1A (e.g., computing system 110, user computing device 102, call center/ associate computing device 104, automated incident reporting system 108, other computing device 109, pre-processing computing device 140, textual analysis computing device 150, temporal analysis computing device 160, change management computing device 170, machine learning engine 180, and the like) may be special purpose computing devices configured to perform specific functions, as illustrated in greater detail below, and may include specific components such as processors, memories, communication interfaces, and/or the like.

The system or network incident detection and analysis computing system 110 may host and/or execute the machine learning engine 180, which may store data and/or instructions that cause and/or enable the system or network incident detection and analysis computing system 110 to perform one or more machine learning functions, incident detection and analysis functions, and the like. For instance, the machine learning engine 180 may be in communication with and/or may interface with one or more of pre-processing computing device 140, textual analysis computing device 150, temporal analysis computing device 160, and change management computing device 170, to perform one or more machine learning functions. For instance, in processing historical data, the pre-processing computing device 140, textual analysis computing device 150, temporal analysis computing device 160, change management computing device 170, may interface with the machine learning engine 180 to perform analysis, generate machine learning data sets which may then be compared to data from incoming incidents to determine impact, and the like. In some examples, the machine learning engine 180 may also collect additional data from newly processed incidents in order to update one or more machine learning data sets with additional data to be used to evaluating future incoming incidents.

Figure 1B:
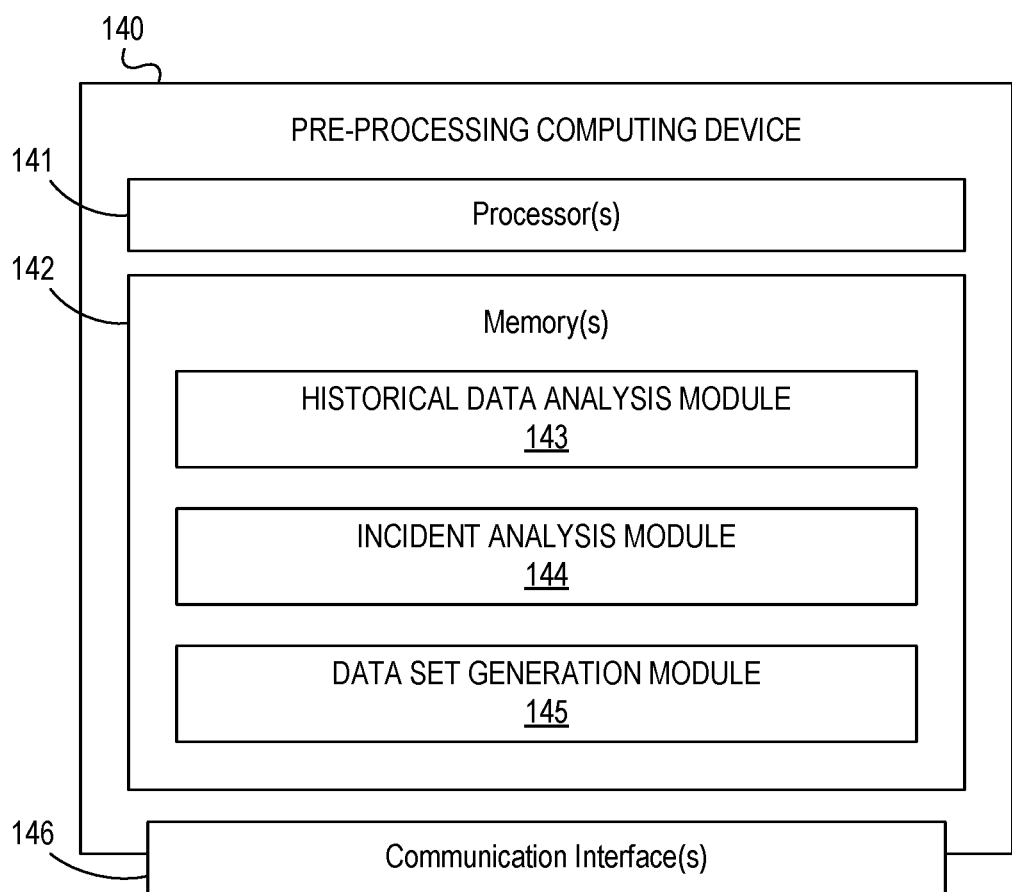

With reference to FIG. 1B, a pre-processing computing device 140 is illustrated. The pre-processing computing device 140 may include one or more processors 141, memory 142, and communication interface 146. A data bus may interconnect processor(s) 141, memory 142, and communication interface 146. Communication interface 146 may be a network interface configured to support communication between the pre-processing computing device 140 and one or more wired and/or wireless networks (e.g., network 130).

Memory 142 may include one or more program modules having instructions that when executed by processor(s) 141 cause the pre-processing computing device 140 and/or the system or network incident detection and analysis computing system 110 to perform one or more functions described herein, In some instances, the one or more program modules may be stored by and/or maintained in different memory units of the pre-processing computing device 140 and/or by different computer systems or devices that may form and/or otherwise make up the system or network incident detection and analysis computing system 110. In some arrangements, different features or processes performed may be performed by different sets of instructions, such that the processor may execute each desired set of instructions to perform different functions described herein.

Memory 142 may include an historical data analysis module 143. The historical data analysis module may include hardware and/or software configured to perform various functions within the pre-processing computing device 140 and/or the system and network incident detection and analysis computing system 110. For instance, the historical data analysis module 143 may interface with machine learning engine 180 to receive or retrieve data related to incidents that previously occurred and have been remedied. Analyzing the historical data may cause the pre-processing computing device 140 and system and network incident detection and analysis computing system 110 to identify (e.g., "learn") what incidents, types of incidents, systems, applications, networks or the like associated with incidents, and the like, led to a significant business impact (e.g., a business impact or magnitude of business impact above a predetermined threshold).

For example, the historical data analysis module 143 (and, in some examples, machine learning engine 180) may evaluate incidents that previously occurred and have been remedied to identify those incidents having a business impact (or magnitude of business impact) above a predetermined threshold. In some examples, the magnitude of the business impact may be determined using an impact matrix to evaluate urgency versus impact. In other examples, the magnitude of business impact may be based on or quantified by cost associated with the failure. For example, costs associated with failed customer interactions, people hours lost, and the like, may be used to quantify the business impact (e.g., after the incident has been resolved). In some examples, both an impact matrix and costs associated with the failure may be used.

After quantifying an impact or magnitude of impact of each incident, the incident may be compared to a threshold. For instance, the business entity may establish a threshold above which a magnitude of business impact is considered significant to the business entity. This threshold may be modified and/or may be vary based on business unit or group within an entity, type of entity, or the like.

After comparing the incidents to the threshold, any incident having an impact or quantified impact at or above the threshold may be flagged as a significant impact incident. Accordingly, additional data associated with each significant impact incident may be mined from the data. For example, information related to a time and date of the incident, application, system, network, or the like, affected by the incident, certain keywords used to describe the incident, and the like, may be mined from the data and used to develop one or more criteria for evaluating incoming incidents in real time or near real-time. One or more of these aspects may be discussed more fully below.

The pre-processing computing device 140 may further include an incident analysis module 144. The incident analysis module 144 may include hardware and/or software configured to perform one or more functions within the pre-processing computing device 140 and/or the system and network incident detection and analysis computing system 110. For example, the incident analysis module 144 may receive one or more incoming incidents (e.g., incidents that have recently occurred, have not been remedied, are ongoing, or the like) and may compare features of the incidents to features identified in the historical data analysis as related to incidents having a significant business impact (e.g., a machine learning data set). For example, a particular application having a failure at a particular time of day may have been identified as having a significant business impact in the historical data. Accordingly, an incident affecting the same application at a same or similar time of day is also likely to have a significant business impact. The incident may then be flagged for further analysis, priority action, or the like.

In some examples, flagging the incident for further analysis may include extracting data from the incident or incident report (e.g., which application, system, device, or the like, is affected, time and date, description of the failure or incident, or the like). The extracted data may then be combined with historical data related to similar incidents (e.g., incidents affecting similar devices, applications, systems, or the like). The data may be transmitted to a data set generation module 145. The data set generation module 145 may include hardware and/or software configured to perform one or more functions within the pre-processing computing device 140 and/or the system and network incident detection and analysis computing system 110. For example, the data set generation module 145 may aggregate the extracted data and historical data to generate a completed analysis data set. The completed analysis data set may then be transmitted to one or more other devices for further analysis and/or processing in order to quantify the impact or potential impact of the incident, allocate resources to address the incident, and the like.

Figure 1C:
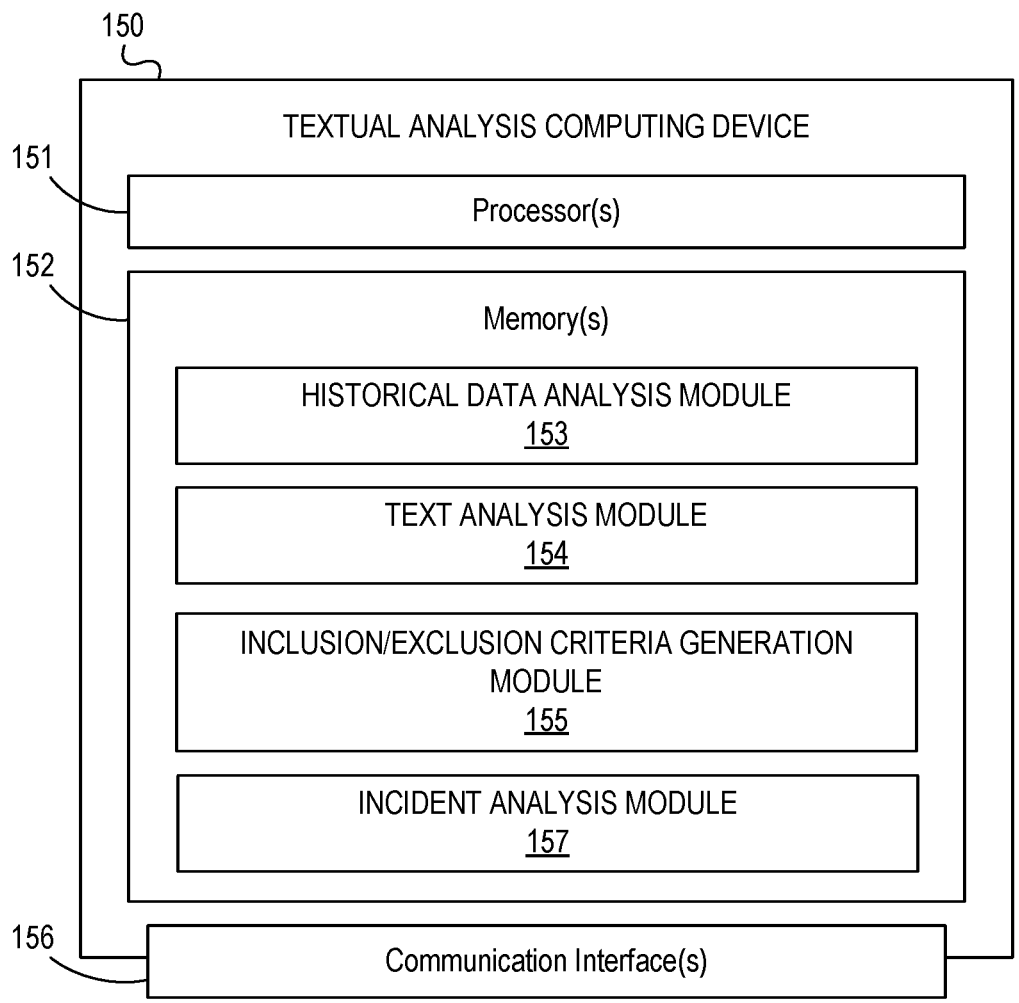

Referring to FIG. 1C, a textual analysis computing device 150 is illustrated. The textual analysis computing device 150 may include one or more processors 151, memory 152, and communication interface 156. A data bus may interconnect processor(s) 151, memory 152, and communication interface 156. Communication interface 156 may be a network interface configured to support communication between the textual analysis computing device 150 and one or more wired and/or wireless networks (e.g., network 130).

Memory 152 may include one or more program modules having instructions that when executed by processor(s) 151 cause the textual analysis computing device 150 and/or the system or network incident detection and analysis computing system 110 to perform one or more functions described herein, In some instances, the one or more program modules may be stored by and/or maintained in different memory units of the textual analysis computing device 150 and/or by different computer systems or devices that may form and/or otherwise make up the system or network incident detection and analysis computing system 110. In some arrangements, different features or processes performed may be performed by different sets of instructions, such that the processor may execute each desired set of instructions to perform different functions described herein.

Memory 152 may include an historical data analysis module 153. The historical data analysis module 153 may include hardware and/or software configured to perform various functions within the textual analysis computing device 150 and/or the system and network incident detection and analysis computing system 110. For instance, the historical data analysis module 153 may interface with the machine learning engine 180 to receive and/or retrieve historical data related to incidents that previously occurred (e.g., have been remedied or are no longer ongoing). The incidents may include data associated with time and date of the incident, system, network, application, or the like, affected by the incident, and the like. In some examples, the incident data may include free-form text describing the incident, aspects of systems or applications affected, and the like. The historical data may further include data related to an impact of each incident, such as a business impact. For instance, similar to the arrangement described above with respect to FIG. 1B, the data may include information quantifying a magnitude of business impact for each incident. The historical data analysis module 153 (and, in some examples, the machine learning engine 180) may parse the data into incidents having an impact at or above a threshold and incidents having an impact below the threshold (e.g., to generate a machine learning data set). In some examples, incidents having a magnitude of impact at or above the threshold may be significant business incidents, while incidents having a magnitude of impact below the threshold might not be significant business incidents.

The textual analysis computing device 150 may further include a text analysis module 154. The text analysis module 154 may include hardware and/or software configured to perform one or more functions within the textual analysis computing device 150 and/or the system or network incident detection and analysis computing system 110. For instance, the text analysis module 154 may interface with machine learning engine 180 to receive the historical data (e.g., machine learning data set) sorted into groups (e.g., those having a significant business impact and those not having a significant business impact) from the historical data analysis module 153. The text analysis module 154 (and, in some examples, the machine learning engine 180) may then parse the data to identify one or more keywords associated with each incident in each of the groups. In some examples, the text analysis module 154 may group the incidents (e.g., within each group) according to application, system, network or device affected prior to identifying keywords in order to improve the accuracy of the analysis.

The text analysis module 154 (and, in some examples, the machine learning engine 180) may perform a correlation analysis to determine how strongly correlated each keyword is to either a significant business impact incident or a non-significant business impact incident. For example, each keyword identified in the group of incidents associated with significant business impact incidents may be evaluated to determine how strong a correlation the word has to the significant business impact incident. For instance, a determination may be made as to a number of times an identified keyword is associated with or was extracted from a significant business impact incident. If the number of times is greater than a first threshold, the keyword may be identified as having a strong correlation. If the keyword is below the first threshold but above a second threshold, the keyword may have a mid-level correlation. If the keyword is below the second threshold, the keyword may be flagged as having a low correlation. Although two thresholds are used in this example, more or fewer thresholds may be used without departing from the invention.

A similar process may then be performed with keywords identified in the group of incidents not having a significant business impact. For instance, keywords having a strong correlation to incidents not having a significant business impact may be used to identify future incidents that might not have a potential significant impact and may be addressed as a lower priority matter. Accordingly, a number of times a keyword appears in incidents not having a significant business impact may be determined. If the number of times is above a first threshold, the keyword may have a strong correlation to incidents not having a significant business impact. If the keyword is below the first threshold and above a second threshold, the keyword may have a mid-level correlation. If the keyword is below the second threshold, the keyword may be flagged as having a low correlation. Similar to above, more or fewer thresholds may be used without departing from the invention.

The text analysis module 154 (and, in some examples, the machine learning engine 180) may then evaluate combinations of keywords to determine how strongly they correlate to incidents having a significant business impact or not having a significant business impact. Similar to the process performed with respect to each keyword, the text analysis module 154 (and, in some examples, the machine learning engine 180) may evaluate each combination of keywords to determine how often a combination appears in incidents having a significant business impact and those not having a significant business impact. A rating system using one or more thresholds may be used to evaluate the number of times a combination appears to determine if it has a correlation (or how strong a correlation) to incidents having a significant business impact or incidents not having a significant business impact. For instance, a number of times a combination of keywords appears in incidents having a significant business impact and those not having a significant business impact may be determined and compared to one or more thresholds, similar to the arrangement discussed above with respect to keyword evaluation.

The text analysis module 154 (and, in some examples, machine learning engine 180) may then evaluate keywords in sequence to identify sequences of keywords strongly correlated to incidents having a significant business impact or incidents not having a significant business impact. A similar process to those described above may be performed to evaluate each combination of keyword sequences to evaluate each keyword sequence and determine how strongly it correlates to either incidents having a significant business impact or incidents not having a significant business impact. A system of one or more thresholds may be used, similar to the arrangements described above.

The textual analysis computing device 150 may further include an inclusion/exclusion criteria generation module 155. The inclusion/exclusion criteria generation module 155 may include hardware and/or software configured to perform various functions within the textual analysis computing device 150 and/or the system or network incident detection and analysis computing system 110. For instance, the inclusion/exclusion criteria generation module 155 may interface with the machine learning engine to receive keywords, combinations and sequences identified by the text analysis module 154 as having a strong correlation to either incidents having a significant business impact or incidents not having a significant business impact. Based on the keywords, combinations and sequences having the strongest correlation, inclusion and exclusion criteria may be generated (e.g., a machine learning data set). For example, keywords, sequences and/or combinations having the strongest correlation to incidents having a significant business impact may be used to generate inclusion criteria. The inclusion criteria may be used to evaluate ongoing or newly detected incidents to determine whether they are likely to have a significant business impact and should be further evaluated or processed.

Based on the keywords, combinations and/or sequences having the strongest correlation to incidents not having a significant business impact, exclusion criteria may be identified. The exclusion criteria may be used to evaluate ongoing to recently detected incidents to determine whether they are likely to not having a significant business impact and should be treated as a lower priority item, have fewer resources assigned to resolving the issue, and the like.

The textual analysis computing device 150 may further include an incident analysis module 157. The incident analysis module 157 may include hardware and/or software configured to perform various functions within the textual analysis computing device 150 and/or the system or network incident detection and analysis computing system 110. For instance, the incident analysis module 157 may receive newly detected incidents (e.g., based on a continuous or periodic scan of a system to identify new or newly reported incidents) and may apply the inclusion/exclusion criteria to determine a likelihood that the incident will have a significant business impact. In some examples, the incident analysis module 157 may evaluate incidents by analyzing a completed analysis data set generated by the pre-processing computing device 140 to evaluate the incident, as well as historical data associated with similar incidents. The incident analysis module 157 may parse the newly received incident to detect terms, for instance, in free-form text descriptions of the incident, time and date of the incident, systems, applications, devices, or the like, affected by the incident, and the like. These terms may then be compared to the inclusion criteria and exclusion criteria (e.g., machine learning data set) to identify incidents that have a likelihood for a significant business impact and incidents that have a likelihood for not having a significant business impact.

In some examples, each identified keyword, combination and/or sequence in the inclusion and exclusion criteria may be associated with a score. The score, in some examples, may be weighted based on a strength of correlation identified for the particular keyword, combination, and/or sequence. Accordingly, the terms extracted from the incident data may be compared to the identified keyword, combination, and/or sequences in the inclusion criteria and exclusion criteria to determine a score based on a number of matches. For example, each match may associate a score of the matching keyword, combination and/or sequence with the term or terms from the incident. The scores for each match may be summed to determine a score for the incident. This score may be compared to one or more thresholds to determine a likelihood that the incident will have a significant business impact (e.g., based on inclusion criteria comparison) or will not have a significant business impact (e.g., based on exclusion criteria comparison).

In some examples, the thresholds used may be modified based on a currently acceptable level of risk. For instance, if a holiday weekend is approaching and the entity will be closed for several days, the entity might be less willing to risk a failure or other incident of a system, application, network, or the like. However, during typical business hours, a higher level of risk may be acceptable and one or more thresholds may be adjusted accordingly.

The incident analysis module 157 may identify incidents that have a potential for significant business impact. The incident analysis module 157 may also identify incidents that may be handled as lower priority matters by comparing incident data to exclusion criteria to identify incidents not likely to have a significant business impact. Those items may be flagged as less urgent and appropriate resources, scheduling, and the like, may be established based on the lower priority (or likelihood of the incident not having a significant business impact).

Figure 1D:
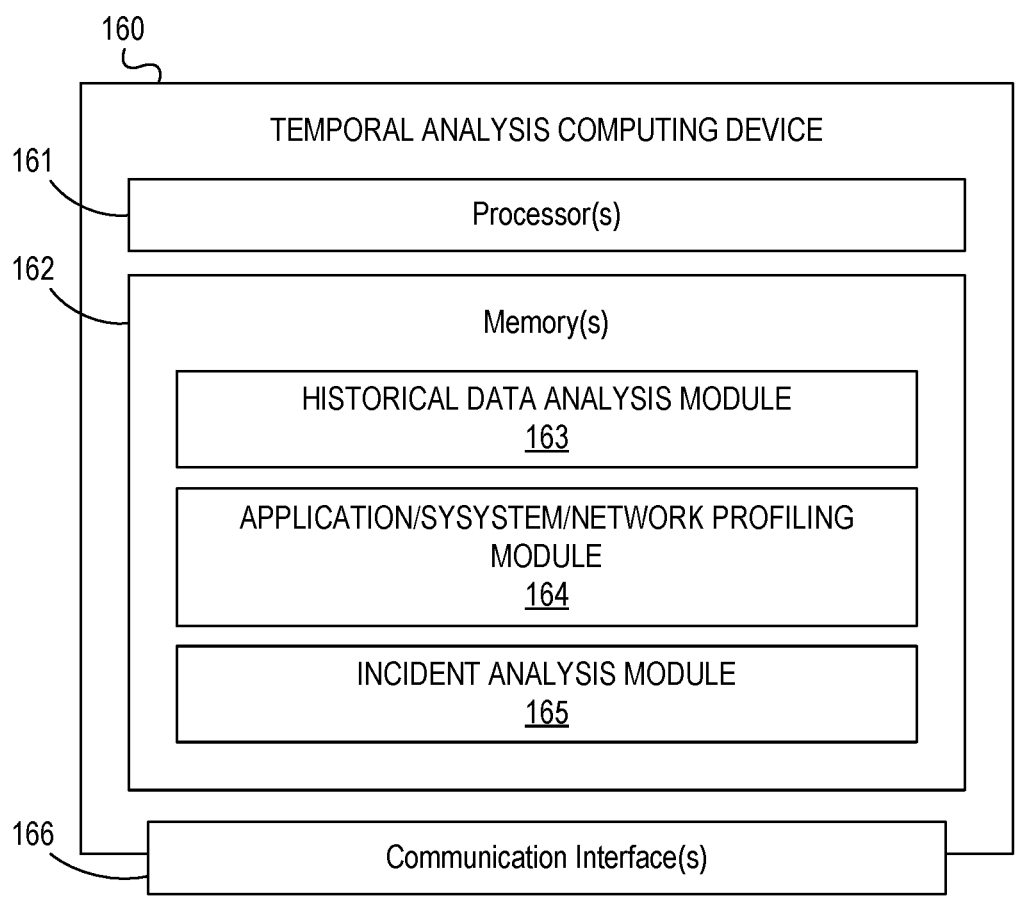

Referring to FIG. 1D, a temporal analysis computing device 160 is illustrated. The temporal analysis computing device 160 may include one or more processors 161, memory 162, and communication interface 166. A data bus may interconnect processor(s) 161, memory 162, and communication interface 166. Communication interface 166 may be a network interface configured to support communication between the temporal analysis computing device 160 and one or more wired and/or wireless networks (e.g., network 130).

Memory 162 may include one or more program modules having instructions that when executed by processor(s) 161 cause the temporal analysis computing device 160 and/or the system or network incident detection and analysis computing system 110 to perform one or more functions described herein. In some instances, the one or more program modules may be stored by and/or maintained in different memory units of the temporal analysis computing device 160 and/or by different computer systems or devices that may form and/or otherwise make up the system or network incident detection and analysis computing system 110. In some arrangements, different features or processes performed may be performed by different sets of instructions, such that the processor may execute each desired set of instructions to perform different functions described herein.

Memory 162 may include an historical data analysis module 163. The historical data analysis module 163 may include hardware and/or software configured to perform various functions within the temporal analysis computing device 160 and/or the system and network incident detection and analysis computing system 110. For instance, the historical data analysis module 163 may interface with machine learning engine 180 to retrieve or receive historical incident data (e.g., from incidents that previously occurred, have been remedied, or the like) and may analyze the data to identify incidents having a significant business impact. As discussed herein, determining that an incident had a significant business impact may be based on a quantified impact being at or above a predetermined threshold.

The historical data analysis module 163 (and, in some examples, the machine learning engine 180) may analyze historical incident data associated with incidents having a significant business impact to identify a location, device, system, application, or the like, associated with the incident, as well as a date and time the incident occurred. For instance, an incident that occurs during business hours for a first application may have a significant business impact, but if the same incident occurred to the first application outside of normal business hours it might not have a significant business impact (e.g., because associates or other employees are not accessing or using the first application outside of business hours). Accordingly, the historical data analysis module 163 (and, in some examples, the machine learning engine 180) may identify dates, times, and the like, associated with the incidents having a significant business impact (e.g., a machine learning data set).

The temporal analysis computing device 160 may further include an application/system/network profiling module 164. The application/system/network profiling module 164 may interface with machine learning engine 180 to use the analyzed historical data (e.g., machine learning data set) to generate a profile for each application, system, network, device, or the like. The profile may include identified times and dates at which, should an incident occur, the incident may have a significant business impact.

The temporal analysis computing device 160 may further include an incident analysis module 165. The incident analysis module 165 may include hardware and/or software configured to perform various functions within the temporal analysis computing device 160 and/or the system or network incident detection and analysis computing system 110. For instance, the incident analysis module 165 may receive one or more newly detected or reported incidents and may analyze data associated with the incident to identify, in real-time or near real-time, an application, system, network, device, or the like associated with the incident and a time and date of the incident. This information may be compared to the profile generated by the application/system/network profiling module 164 for the identified application, system, network, device, or the like, to determine a likelihood that the incident will have a significant business impact (e.g., based on historical data associated with incidents affecting a same or similar application, system, network, or the like, at a same or similar date and/or time).

If it is determined that the newly received or detected incident is likely to have a significant business impact, the incident analysis module 165 may generate a notification to one or more users indicating that the incident is likely to have a significant business impact. The notification may be transmitted to one or more computing devices (such as other computing device 109) and may be displayed (e.g., the temporal analysis computing device 160 may command, direct or cause the notification to be displayed on the computing device). In some examples, the notification may include a pop-up window notification that may appear within an application. In other examples, the notification may be transmitted via email to one or more users. In examples in which an email is transmitted, the distribution list to which the email may be transmitted may be based on one or more features of the incident (e.g., the application involved, the system involved, or the like).

Figure 1E:
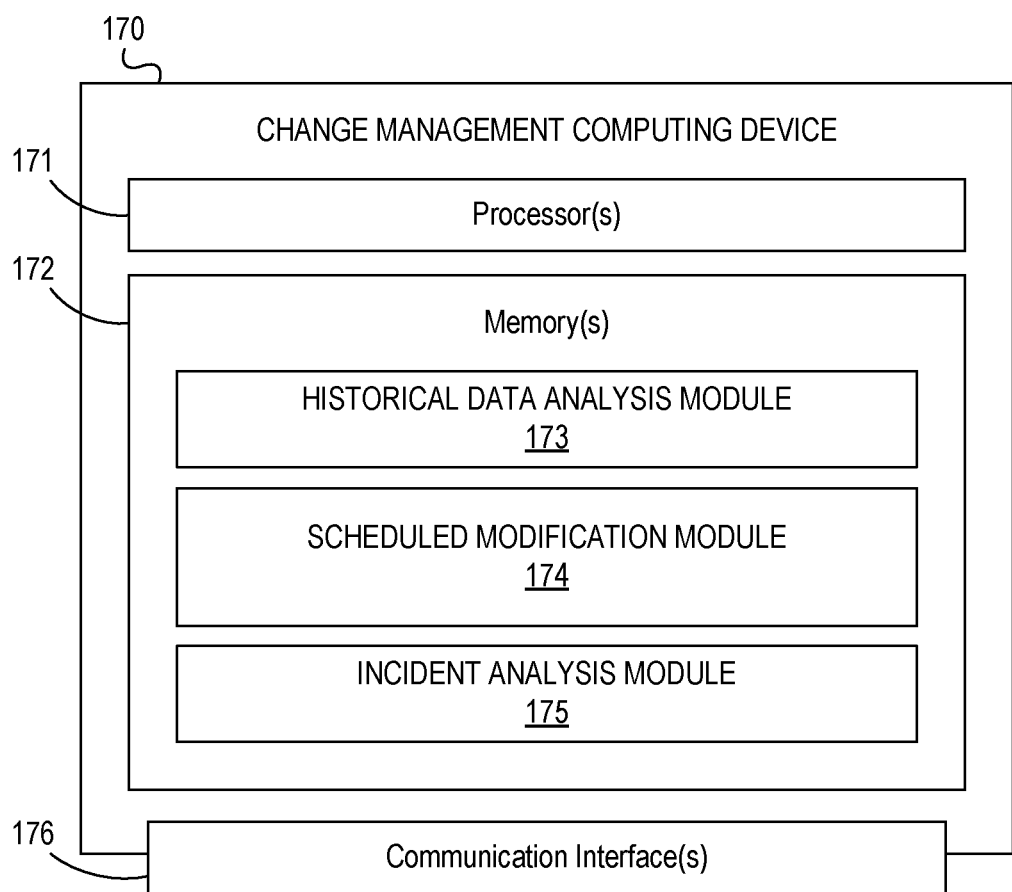

Referring to FIG. 1E, a change management computing device 170 is illustrated. The change management computing device 170 may include one or more processors 171, memory 172, and communication interface 176. A data bus may interconnect processor(s) 171, memory 172, and communication interface 176. Communication interface 176 may be a network interface configured to support communication between the change management computing device 170 and one or more wired and/or wireless networks (e.g., network 130).

Memory 172 may include one or more program modules having instructions that when executed by processor(s) 171 cause the change management computing device 170 and/or the system or network incident detection and analysis computing system 110 to perform one or more functions described herein, In some instances, the one or more program modules may be stored by and/or maintained in different memory units of the change management computing device 170 and/or by different computer systems or devices that may form and/or otherwise make up the system or network incident detection and analysis computing system 110. In some arrangements, different features or processes performed may be performed by different sets of instructions, such that the processor may execute each desired set of instructions to perform different functions described herein.

Memory 172 may include an historical data analysis module 173. The historical data analysis module 173 may include hardware and/or software configured to perform various functions within the change management computing device 170 and/or the system and network incident detection and analysis computing system 110. For instance, the historical data analysis module 173 may interface with the machine learning engine to retrieve or receive historical incident data (e.g., from incidents that previously occurred, have been remedied, or the like) and identify one or more incidents that had a significant business impact. As discussed herein, an incident having a significant business impact may be based on a magnitude of the impact being above a predetermined threshold.

The one or more incidents identified as having a significant business impact may then be further evaluated. For instance, data associated with the incidents may be analyzed to determine one or more applications, systems, devices, networks, locations (e.g., of a particular device, system, or the like) and the like associated with the incident.

The change management computing device 170 may further include a scheduled modification module 174. The scheduled modification module 174 may include hardware and/or software configured to perform various functions within the change management computing device 170 and/or the system or network incident detection and analysis computing system 110. For instance, the scheduled modification module 174 may store or retrieve data associated with scheduled modifications (e.g., scheduled maintenance to a system, update installation, and the like) to one or more applications, systems, networks, devices, locations, and the like. This data may be analyzed to determine date and time associated with the modification, as well as the system, network, device, application, or the like, being modified. This information may then be used to determine a cause associated with an incident in real-time or near real-time.

For example, the change management computing device 170 may include an incident analysis module 175. The incident analysis module 175 may include hardware and/or software configured to perform one or more functions within the change management computing device 170 and/or the system or network incident detection and analysis computing system 100. For instance, the incident analysis module may receive a newly detected or reported incident and may analyze data associated with the incident to determine a system, application, device, network, location, or the like affected by the incident, as well as a date and time of the incident. This data may be compared to the scheduled modification data to determine whether a scheduled modification for the identified application, system, network, device, location, or the like, was scheduled for the date and time at which the incident occurred. If so, the scheduled modification may be identified, in real-time or near-real time, as the likely cause of the incident, which may aid in responding quickly to rectify the issue, allocate resources, and the like.

In some examples, the change management computing device 170 may be configured to proactively anticipate potential incidents and a potential impact by comparing scheduled modification data for one or more systems, applications, networks, devices, or the like, to historical data to determine whether the same or similar modifications previously cause an incident. If so, it may be determined that a future incident is likely for the scheduled modification and one or more notifications may be transmitted to a computing device indicating the potential incident and/or a potential impact.

In some examples, a confidence level may be determined associated with the determination that the scheduled modification is the likely cause of the incident or will likely cause a future incident. For example, if the device associated with the incident and the device of the scheduled modification are an exact match (e.g., same particular device rather than same type of device, or the like), a higher confidence level may be assigned. In another example, if the device in the historical incident having a significant business impact is an exact match for the device for which the modification is scheduled, a higher confidence level may be assigned. In yet another example, if the time of the incident was within a predetermined time frame of the scheduled modification but the devices are similar but not an exact match, a lower confidence level may be assigned.

If the scheduled modification is determined to be the likely cause of the incident, the incident analysis module 175 may generate a notification. The notification may include an indication that the scheduled modification was the likely cause of the incident, may identify the incident, and provide additional information. The notification may be transmitted to one or more computing devices (such as other computing device 109) and the change management computing device 170 may command, direct or cause the notification to be displayed on the one or more computing devices. The notification may be a pop-up user interface appearing in application. In some examples, the notification may be an email message transmitted to one or more users. In some arrangements, the one or more users receiving the email may be based on one or more features of the incident, the scheduled modification, or the like. In some examples, the notification may include an alert including an indication of the incident, a potential magnitude of the incident, a type of incident, historical data, and the like.

FIGS. 2A-2D illustrate one example event sequence for pre-processing data and evaluating incidents in accordance with one or more aspects described herein. The sequence illustrated in FIGS. 2A-2D is merely one example sequence and various other events may be included, or events shown may be omitted, without departing from the invention. In addition, aspects described with respect to FIGS. 2A-2D may be performed by a pre-processing computing device 140 or by one or more other devices associated with the system or network detection and analysis computing system 110.

Figure 2A:
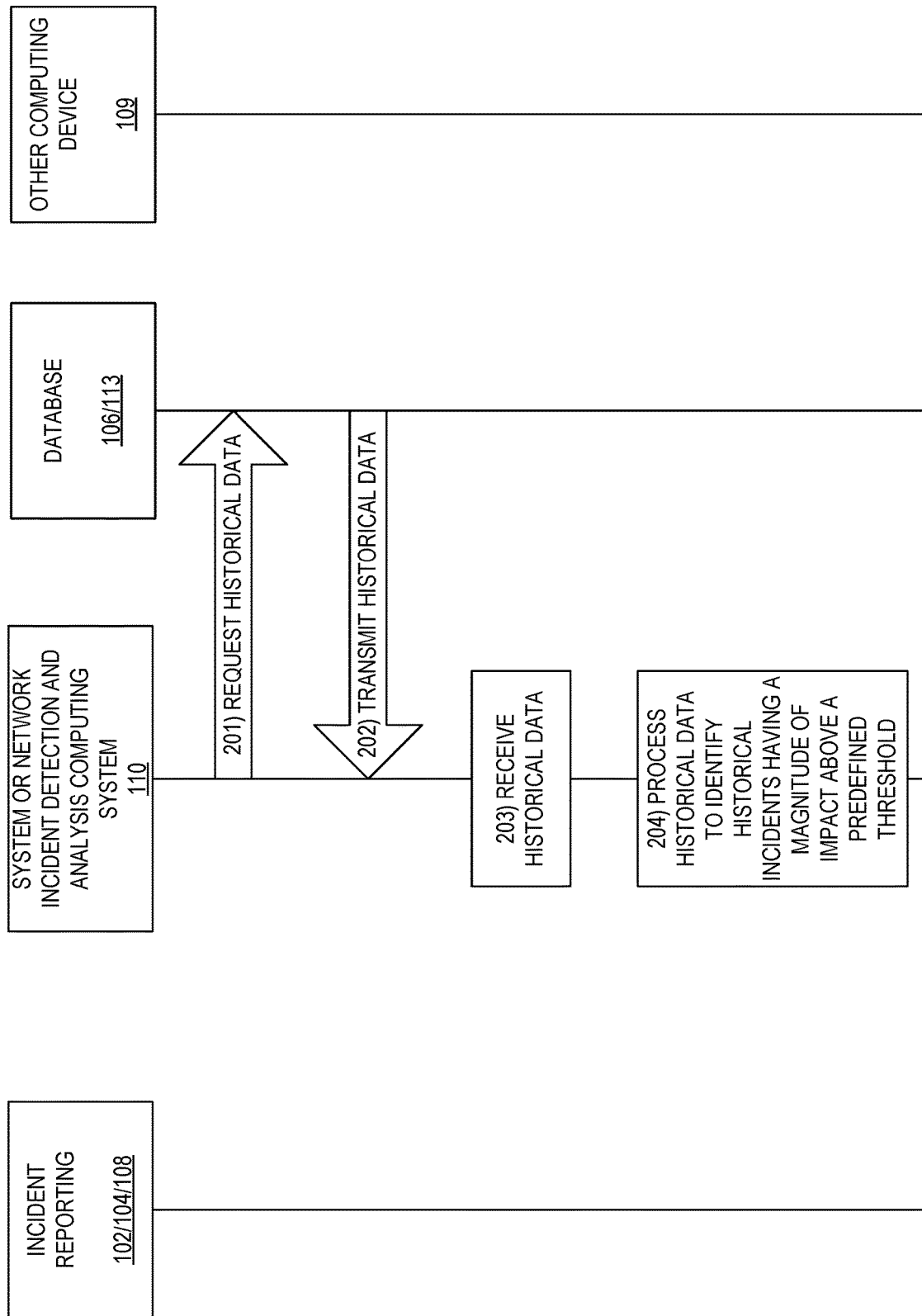

With reference to FIG. 2A, in step 201, a request for historical data may be transmitted to one or more databases. In step 202, historical data may be transmitted from one or more databases, such as database 113 or database 106, to a pre-processing computing device 140 and/or machine learning engine 180 of the system or network incident detection and analysis computing system 110. As discussed herein, the historical data may include data associated with incidents that previously occurred and have been remedied or addressed. The historical data may include data related to each incident, such as systems, applications, networks, devices, or the like, impacted by the incident, time and date of the incident, classification and recordation information for the incident (e.g., a type of incident, or the like) and the like. In some examples, classification data may include information associated with a failure mode or context in which the incident occurred.

In step 203, the historical data may be received by the system or network incident detection and analysis computing system 110. In step 204, the historical data may be processed to identify one or more incidents having a magnitude of impact above a predetermined threshold (e.g., a machine learning data set). For example, as discussed herein, an impact matrix and/or information related to quantifying a cost associated with the incident (loss costs due to lost customer interaction, lost people hours, and the like). This information may be used to evaluate each historical incident and quantify an impact of each incident. The quantified impact may then be compared to a predetermined threshold. Any incidents at or above the threshold may be considered as having a significant business impact. The incidents identified as having an impact above the threshold may be a portion (e.g., less than all) of the plurality of incidents analyzed. In some examples, processing and analyzing the historical data may include evaluating keywords within an incident report and/or evaluating incidents based on a time or date at which the incident occurred and the resulting impact.

Figure 2B:
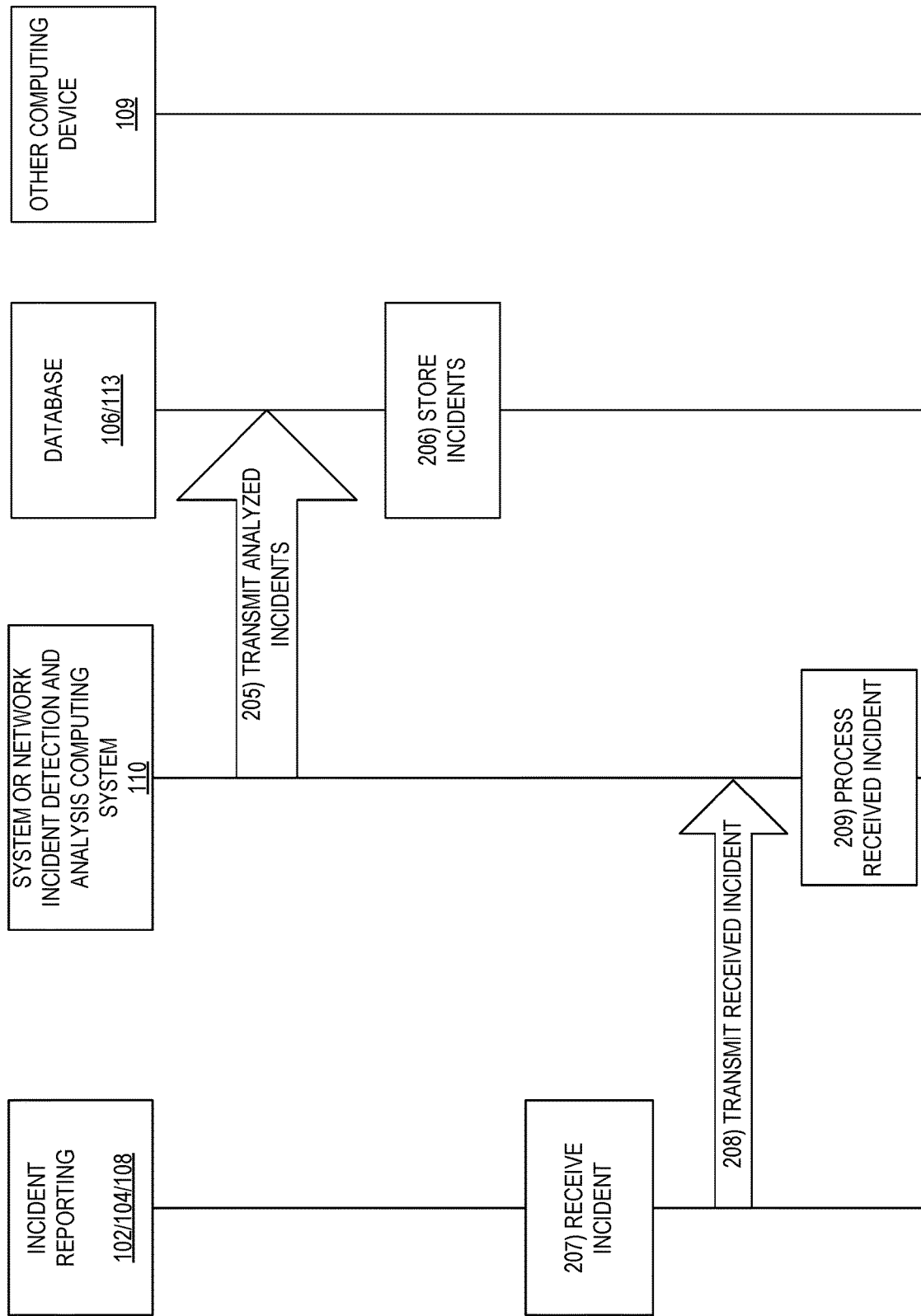

With reference to FIG. 2B, in step 205, the analyzed incidents (e.g., incidents identified as having a significant business impact) may be transmitted to one or more databases for storage, in step 206.

In step 207, an incident may be received (e.g., by a user computing device 102, associate/call center computing device 104, or the like) or may be detected, such as by an automated incident reporting system 108. The incident may be transmitted to the system or network incident detection and analysis computing system 110 in step 208. In step 209, the incident may be processed (e.g., in real-time or near real-time) and data associated with the incident may be analyzed and extracted.

Figure 2C:
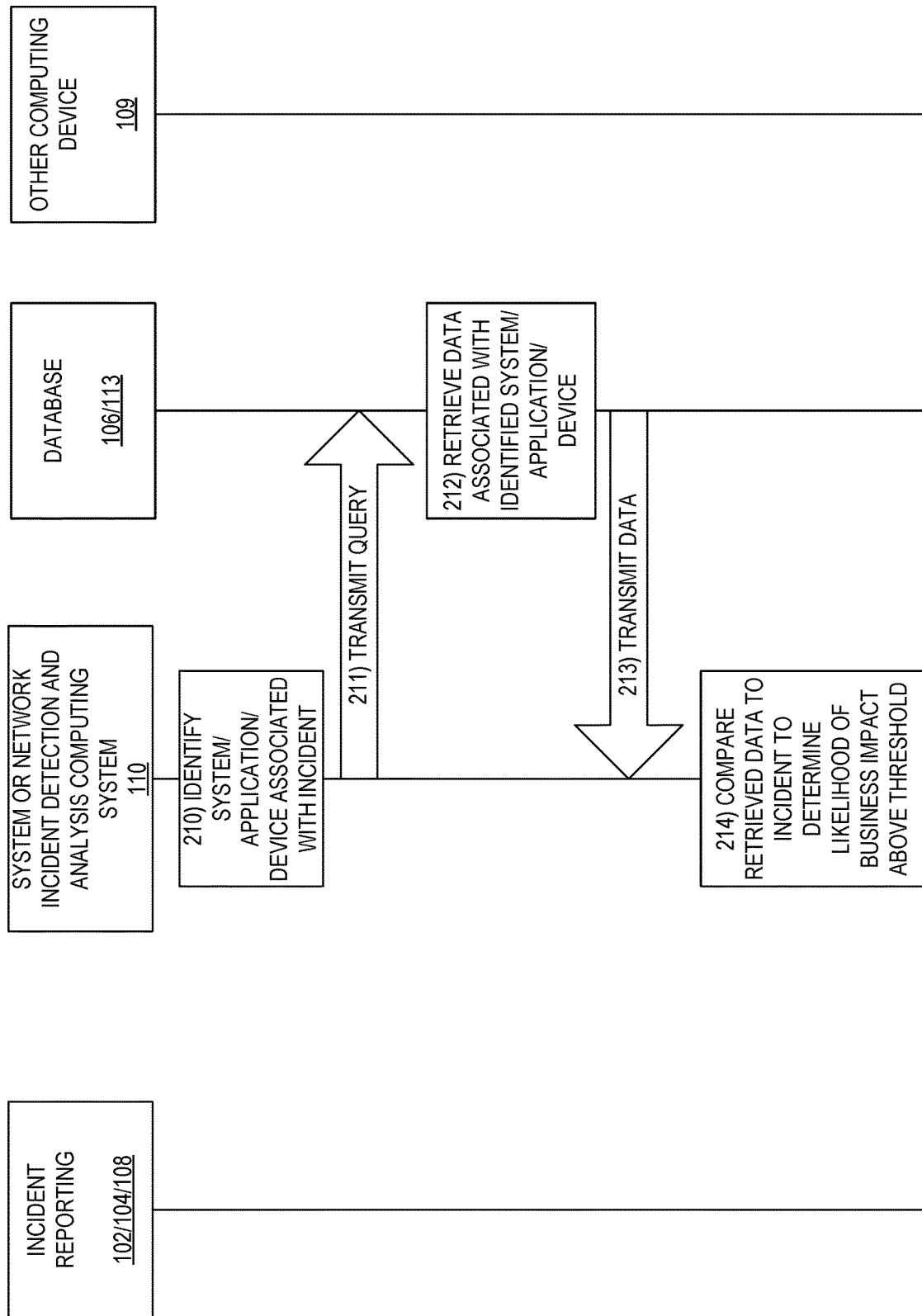

With reference to FIG. 2C, in step 210, the incident data may be used to identify an application, system, network, device, or the like, impacted by the incident. The identified application, system, network, device, or the like, may be used as an input in a query transmitted to one or more databases 106, 113 in step 211. In step 212, the database may retrieve historical data (e.g., analyzed historical data identifying incidents having a significant business impact) related to the identified application, system, network, device, or the like.

In step 213, the retrieved data may be transmitted to the system or network detection and analysis computing system 110 for further analysis. For instance, in step 214, the retrieved data may be compared to the incident data to determine whether the historical data indicates that that it is likely the incident may have a significant business impact. For instance, a same or similar incident in the historical data impacting a same or similar application that was identified as having a significant business impact may indicate that this incident is also likely to have a significant business impact. Accordingly, the incident may be flagged for additional processing.

For instance, with reference to FIG. 2D, in step 215, if, based on the comparison with the retrieved historical data, it is likely that the incident may have a significant business impact, data extracted from the incident report may be combined or aggregated with the historical data retrieved from the database. In step 216, a completed analysis data set may be generated from the aggregated data. The completed analysis data set may undergo additional analysis and evaluated (e.g., by one or more other computing devices within the system or network incident detection and analysis computing system 110) and/or the incident and/or combined data set may be transmitted to another computing device 109 for further processing in step 217. For instance, the other computing device 109 may be associated with a system administrator or other user who may allocate resources, designate priority, or the like, for responding to and addressing the incident.

In step 218, one or more machine learning data sets may be updated. For instance, the incident processed may be remedied and data collected for the incident may be stored and processed (e.g., by the pre-processing computing device 140 and machine learning engine 180) to update one or more data sets with the newly processed incident.

FIGS. 3A-3E illustrate one example event sequence for performing a textual analysis and evaluating incidents in accordance with one or more aspects described herein. The sequence illustrated in FIGS. 3A-3E is merely one example sequence and various other events may be included, or events shown may be omitted, without departing from the invention. In addition, aspects described with respect to FIGS. 3A-3E may be performed by a textual analysis computing device 150 and/or by one or more other devices associated with the system or network detection and analysis computing system 110.

Figure 3A:
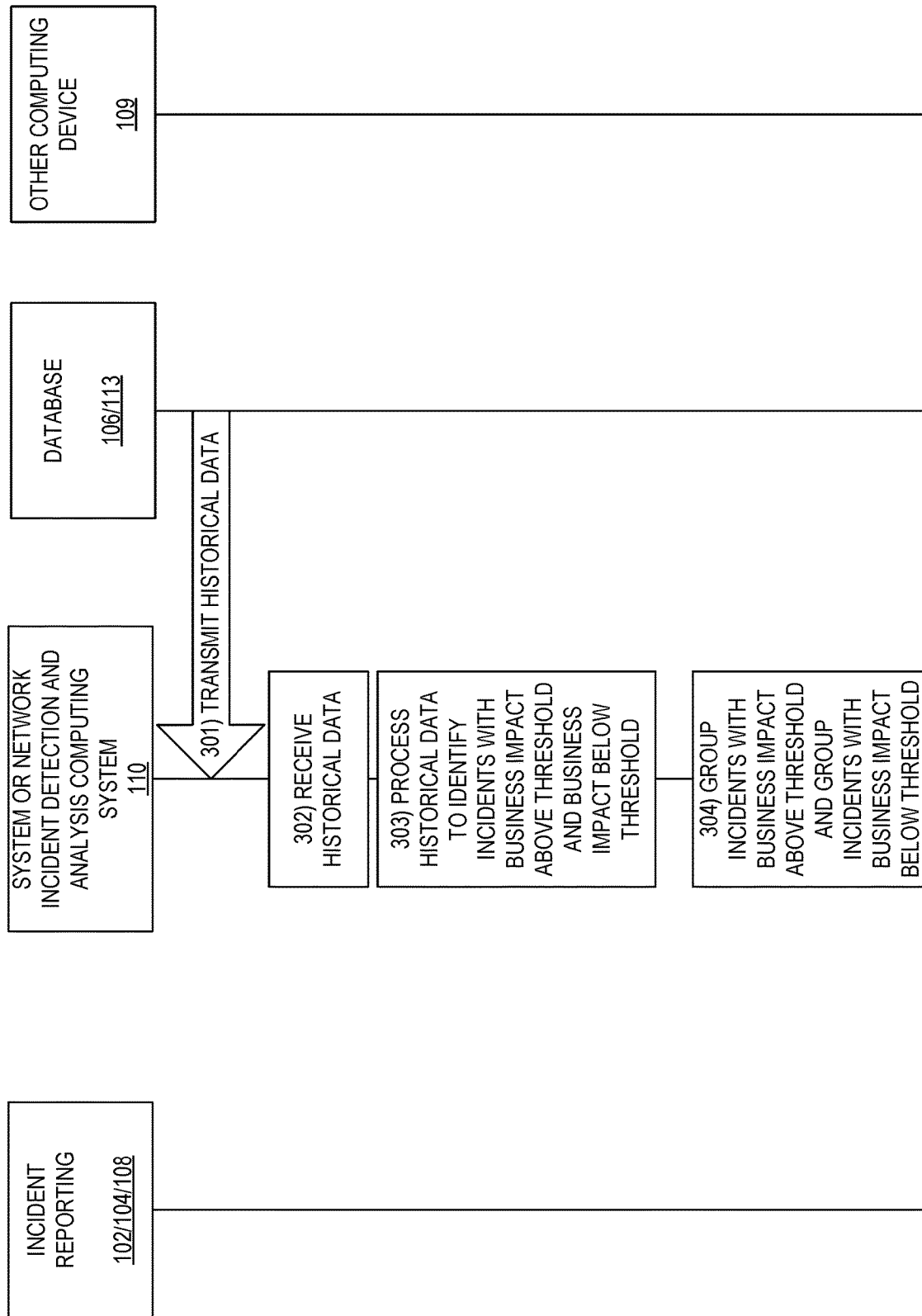

With reference to FIG. 3A, in step 301, historical data may be received by a textual analysis computing device 150, machine learning engine 180, and/or the system or network incident detection and analysis computing system 110. Similar to the arrangements discussed above, the historical data may include incidents associated with one or more applications, systems, networks, devices, or the like, that previously occurred and have been rectified. Accordingly, the impact of those incidents may be known based on data collected following the incident.

In step 302, the historical data may be received, and the data may be processed and historical incidents having a significant business impact and not having a significant business impact (e.g., a machine learning data set) may be identified in step 303. For example, as discussed above, incidents having a significant business impact may be identified by comparing a quantified impact of each incident to a threshold. If the impact is at or above the threshold, the incident may be deemed to have had a significant business impact. If the impact is below the threshold, the incident may be deemed to not have had a significant business impact. Once the incidents having a significant business impact and not having a significant business impact have been identified, the incidents may be grouped according to impact in step 304. In some examples, each group may be processed separately to identify different criteria, as will be discussed more fully below.

Figure 3B:
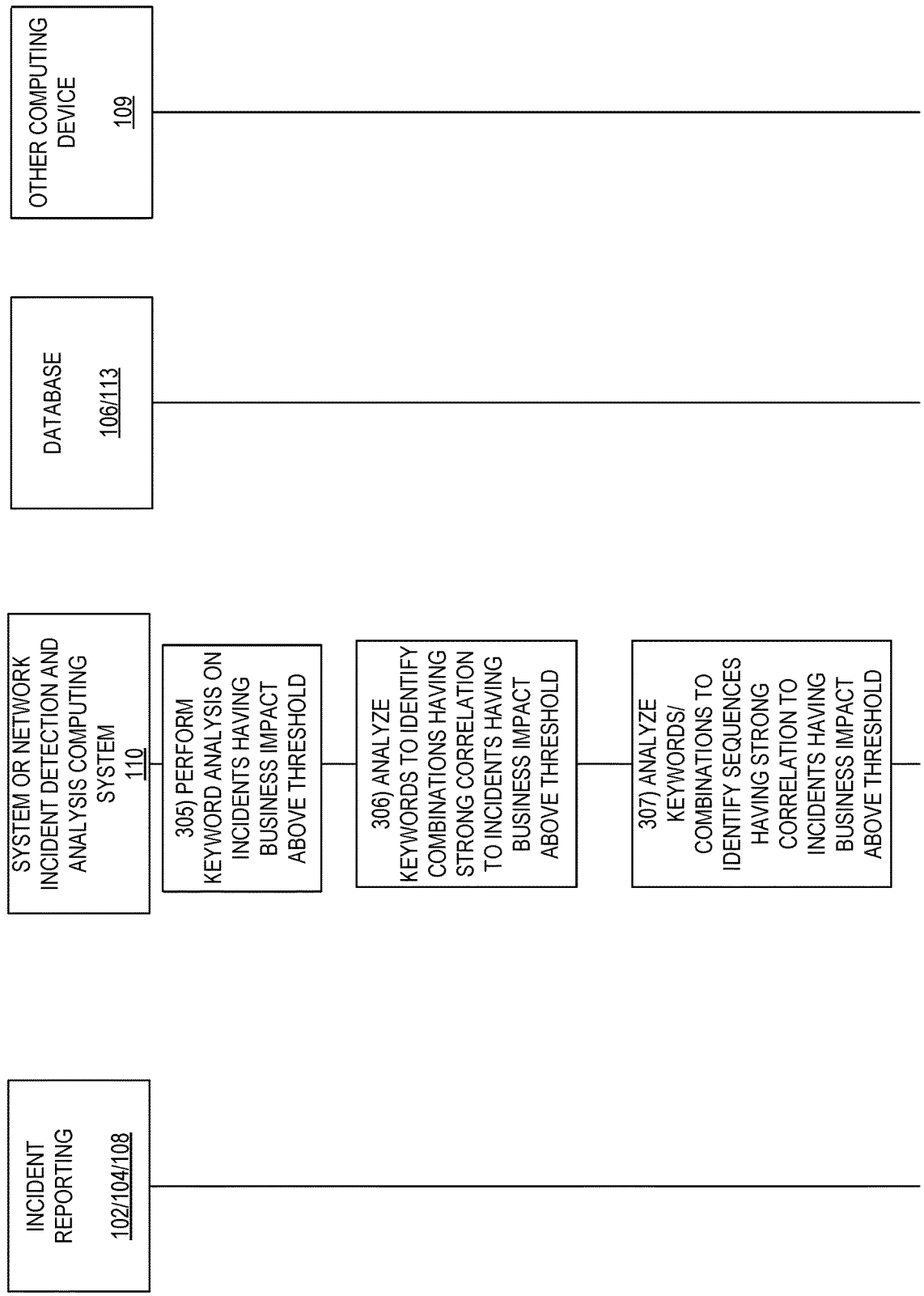

With reference to FIG. 3B, in step 305, a keyword analysis may be performed on each incident having a significant business impact (e.g., impact above threshold). Performing the keyword analysis may include identifying keywords in the incidents or incident reports. For example, incident reports may include free-form text describing the incident, systems or applications impacted, potential cause, or other descriptions related to the incident. This text may be evaluated to identify one or more keywords.

In step 306, the identified keywords are further evaluated to identify combinations of keywords that have a strong correlation to incidents having a significant business impact. For instance, each combination of keywords may be evaluated to identify a number of times each combination appears in incidents having a significant business impact. The number of occurrences may be compared to a threshold and, if at or above the threshold, the combination may have a strong correlation. In some examples, two or more thresholds may be used to provide different levels of strength of correlation, as described above.

In step 307, the keywords and combinations may be further evaluated to identify sequences of terms having a strong correlation to incidents having a significant business impact. For instance, each sequence of keywords may be evaluated to identify a number of times each sequence appears in incidents having a significant business impact. The number of occurrences may be compared to a threshold and, if at or above the threshold, the sequence may be identified as having a strong correlation to incidents having a significant business impact. In some examples, two or more thresholds may be used, as discussed more fully above.

With reference to FIG. 3C, in step 308, inclusion criteria (e.g., a machine learning data set) may be generated from the identified keywords, combinations and/or sequences having a strong correlation to incidents having a significant business impact. Inclusion criteria may include criteria use to evaluate newly received or detected incidents to identify incidents that are likely to have a significant business impact and should be included in further processing and evaluation.

A similar process may be performed for the group of incidents not having a significant business impact. For instance, in step 309, a keyword analysis may be performed on each incident not having a significant business impact (e.g., impact below threshold). Performing the keyword analysis may include identifying keywords in the incidents or incident reports. For example, incident reports may include freeform text describing the incident, systems or applications impacted, potential cause, or other descriptions related to the incident. This text may be evaluated to identify one or more keywords.

In step 310, the identified keywords are further evaluated to identify combinations of keywords that have a strong correlation to incidents not having a significant business impact (e.g., impact below threshold). For instance, each combination of keywords may be evaluated to identify a number of times each combination appears in historical incidents not having a significant business impact. The number of occurrences may be compared to a threshold and, if at or above the threshold, the combination may have a strong correlation to incidents not having a significant business impact. In some examples, two or more thresholds may be used to provide different levels of strength of correlation, as described above.

Figure 3D:
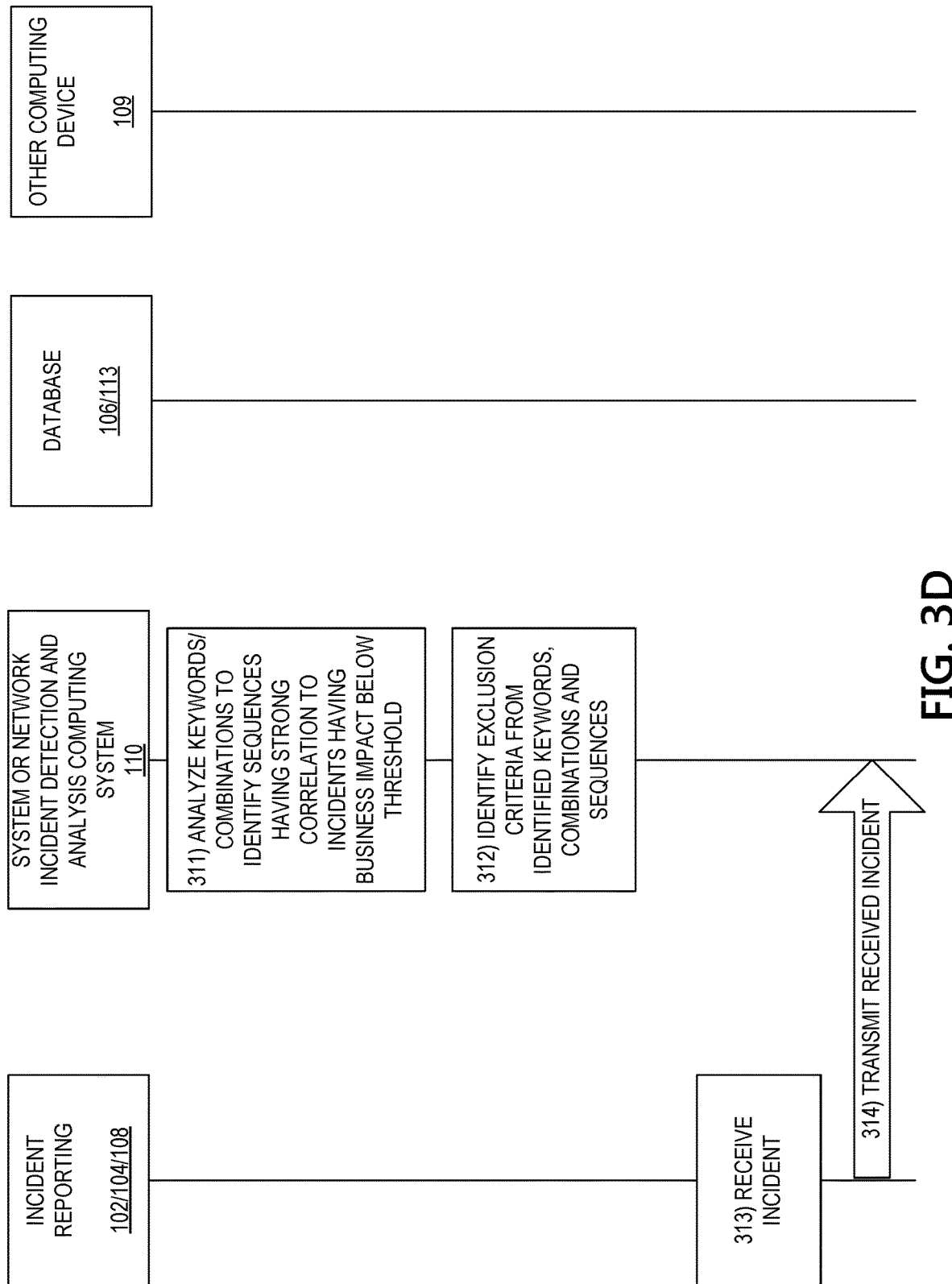

With reference to FIG. 3D, in step 311, the keywords and combinations may be further evaluated to identify sequences of terms having a strong correlation to incidents not having a significant business impact. For instance, each sequence of keywords may be evaluated to identify a number of times each sequence appears in incidents not having a significant business impact. The number of occurrences may be compared to a threshold and, if at or above the threshold, the sequence may be identified as having a strong correlation to incidents not having a significant business impact. In some examples, two or more thresholds may be used, as discussed more fully above.

In step 312, exclusion criteria (e.g., a machine learning data set) may be generated from the identified keywords, combinations and/or sequences having a strong correlation to incidents not having a significant business impact. Exclusion criteria may include criteria use to evaluate newly received or detected incidents to identify incidents that are not likely to have a significant business impact and thus should be considered a lower priority, have fewer resources assigned to addressing, have less urgency, or the like.

In step 313, an incident may be received (e.g., by a user computing device 102, associate/call center computing device 104, or the like) or may be detected, such as by an automated incident reporting system 108. The incident may be transmitted to the system or network incident detection and analysis computing system 110 in step 314.

With reference to FIG. 3E, in step 315, the incident may be processed (e.g., in real-time or near real-time) and data associated with the incident may be analyzed and extracted. In step 316, inclusion and exclusion criteria may be applied to the incident and associated data to determine whether the incident is likely to have a significant business impact and should be a high priority item or whether the incident is likely to not have a significant business impact and should be given a lower priority. For instance, the data from the incident may be compared to the keywords, combinations and/or sequences forming in the inclusion and exclusion criteria. If there is a match, the incident will be labeled or flagged as likely to cause a significant business impact (if match is with inclusion criteria) or not likely to have a significant business impact (if match is with exclusion criteria). In some examples, each keyword, combination and/or sequence in the inclusion and exclusion criteria may have a score assigned to it. Accordingly, for each match within an incident, the corresponding score may be assigned the incident. The sum of all scores may then be compared to one or more thresholds to determine a level of likelihood that the incident will have a significant business impact or will not have a significant business impact.

For example, if an incident includes three sequences matching inclusion criteria, the sum of the scores of the three sequences may be a score for the incident. If the score for the incident is above a first predetermined threshold, the incident may be considered highly likely to cause a significant business impact. If the score is below the first threshold but above a second threshold, the incident may be somewhat likely to cause a significant business impact. If the score is below the second threshold, the incident may be likely to cause a significant business impact (e.g., less likely that incidents above the second threshold). More or fewer thresholds may be used without departing from the invention.

In step 317, the results may be transmitted to another computing device. For instance, if the incident is identified as likely to cause a significant business impact, an indication may be transmitted to one or more computing devices for further action, resource allocation, priority action, and the like. If the incident is identified as not likely to cause a significant business impact, the results may be transmitted with an indication that priority action does not apply or is not needed, that urgency is low, or other similar indication.

In step 318, one or more machine learning data sets may be updated based on the newly processed incident. For example, data associated with the newly processed incident may be stored in historical data and may be part of a further processing (e.g., by the textual analysis computing device 150 and/or the machine learning engine 180) of historical data to identify inclusion and exclusion criteria, as discussed herein. Inclusion and/or exclusion criteria (e.g., machine learning data sets) may then be updated based on the analysis.

Figure 4B:
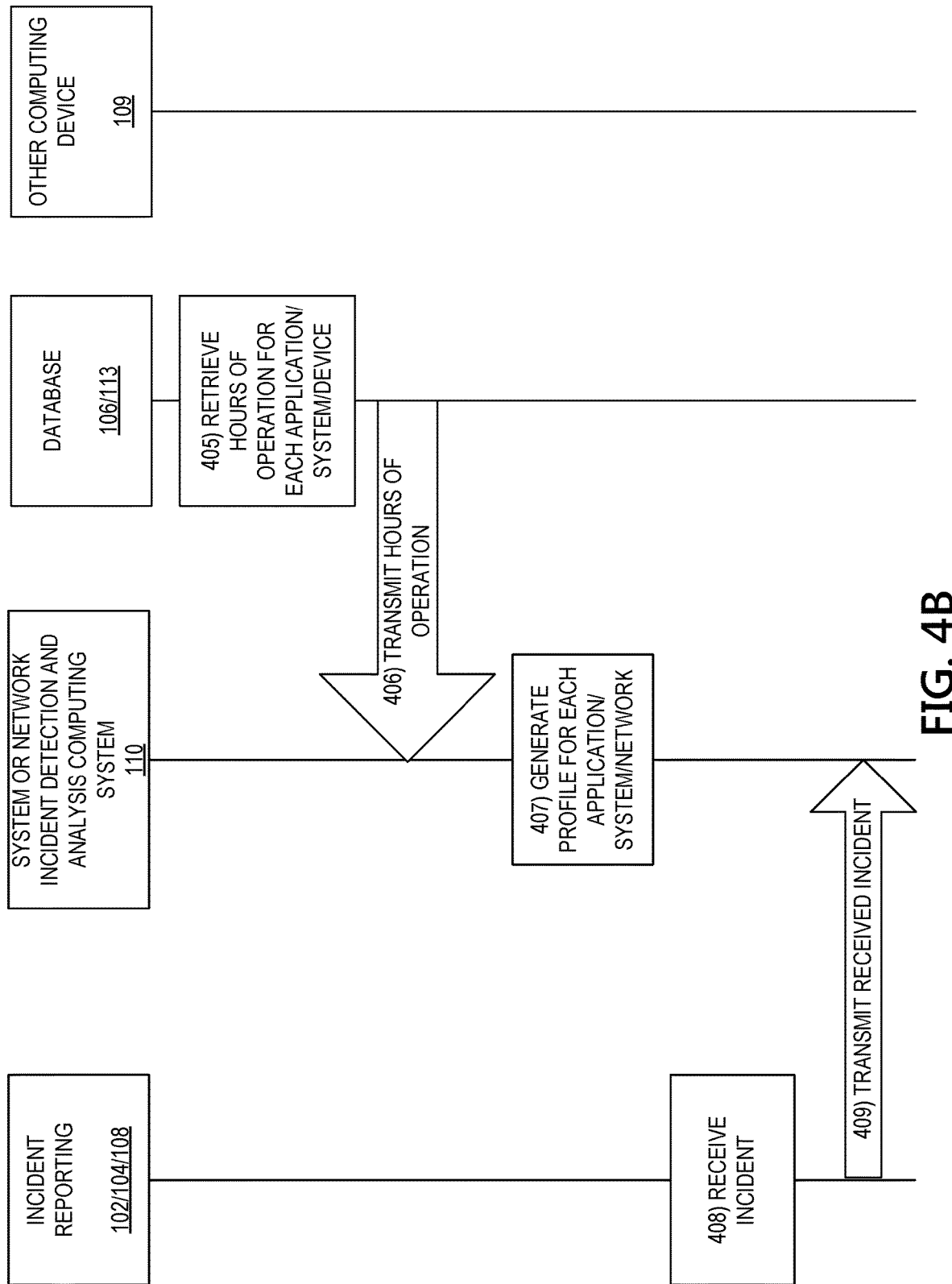

FIGS. 4A-4C illustrate one example event sequence for performing a temporal analysis and evaluating incidents in accordance with one or more aspects described herein. The sequence illustrated in FIGS. 4A-4C is merely one example sequence and various other events may be included, or events shown may be omitted, without departing from the invention. In addition, aspects described with respect to FIGS. 4A-4C may be performed by a temporal analysis computing device 160 and/or by one or more other devices associated with the system or network detection and analysis computing system 110.

With reference to FIG. 4A, in step 401, historical data may be received by a temporal analysis computing device 160, machine learning engine 180, and/or the system or network incident detection and analysis computing system 110. Similar to the arrangements discussed above, the historical data may include incidents associated with one or more applications, systems, networks, devices, or the like, that previously occurred and have been rectified. Accordingly, the impact of those incidents may be known based on data collected following the incident.

In step 402, the historical data may be received and, in step 403, may be processed and historical incidents having a significant business impact (e.g., a business impact above a predetermined threshold, as discussed herein) may be identified (e.g., a machine learning data set). The data associated with the incidents having a significant business impact may be analyzed to identify a date and time at which each incident occurred, as well as an application, system, location, network, device, or the like, associated with or impacted by the incident.

In step 404, the application, system, network, location, device, or the like associated with each incident may be used as input in query transmitted to one or more databases in step 404. The query may be directed to identifying normal business or operating hours for the application, system, network, device, location, or the like. For example, while an online application such as online banking may be available 24 hours/day, a system such as one used by a bank teller may only operate or be used between 8:00 a.m. and 5:00 p.m. Monday through Friday. Accordingly, this information may be significant in evaluating a likelihood that an incident will have a significant business impact.

With reference to FIG. 4B, in step 405, data related to the normal hours of operation or use of the application, system, network, device, location, or the like, may be retrieved and transmitted to the system or network incident detection and analysis computing system 110 in step 406. In step 407, the hours of operation and incident data may be used to generate a profile for each application, system, network, device, location, or the like, for which an incident having a significant business impact was identified. The profile may be used to evaluate newly received or detected incidents in real-time or near real-time.

In step 408, an incident may be received (e.g., by a user computing device 102, associate/call center computing device 104, or the like) or may be detected, such as by an automated incident reporting system 108. The incident may be transmitted to the system or network incident detection and analysis computing system 110 in step 409.

With reference to FIG. 4C, in step 410, the incident may be processed (e.g., in real-time or near real-time) and data associated with the incident may be analyzed and extracted. For instance, data associated with a system, network, location, device, application, or the like, associated with or impacted by the incident may be identified. In addition, time and date information for the incident may be identified. This information may then be compared to the profile generated for the application, system, network, device, or the like, to determine whether the incident (e.g., based on the application, system, network, device, or the like, impacted and the date and time at which the incident occurred) is likely to cause a significant business impact (e.g., based on previous incidents in historical data). If so (e.g., if the data from the incident matches profile data) one or more notifications may be generated and transmitted to one or more user devices in step 411. The notifications may indicate that the incident is likely to cause a significant business impact and, as such, should be addressed as a high priority incident, have resources allocated, action taken quickly, and the like.

In step 412, one or more machine learning data sets may be updated. For instance, the newly received and processed incident may be stored with other historical data (e.g., upon the incident being remedied, data being collected, and the like). Accordingly, the newly processed incident may be included in further analysis of historical data to identify times, dates, and the like, associated with incidents having a significant business impact and generate one or more updated machine learning data sets.

FIGS. 5A-5D illustrate one example event sequence for performing a change management evaluation and evaluating incidents in accordance with one or more aspects described herein. The sequence illustrated in FIGS. 5A-5D is merely one example sequence and various other events may be included, or events shown may be omitted, without departing from the invention. In addition, aspects described with respect to FIGS. 5A-5D may be performed by a change management computing device 170 and/or by one or more other devices associated with the system or network detection and analysis computing system 110.

With reference to FIG. 5A, in step 501, historical data may be received by a change management computing device 170 and/or the system or network incident detection and analysis computing system 110. Similar to the arrangements discussed above, the historical data may include incidents associated with one or more applications, systems, networks, devices, or the like, that previously occurred and have been rectified. Accordingly, the impact of those incidents may be known based on data collected following the incident.

In step 502, the historical data may be received and, in step 503, may be processed and historical incidents having a significant business impact (e.g., a business impact above a predetermined threshold, as discussed herein) may be identified (e.g., a machine learning data set). Data associated with incidents having a significant business impact may then be analyzed to identify a device, application, location, system, network, or the like, associated with the incident or impacted by the incident.

In step 504, a listing of scheduled modifications may be received. The listing may include identification of the systems, networks, locations, applications, devices, and the like, for which modifications are being made, as well as dates and times at which the modifications will occur. Scheduled modifications may include device upgrades, software installation or updates, system maintenance or updates, and the like.

Figure 5B:
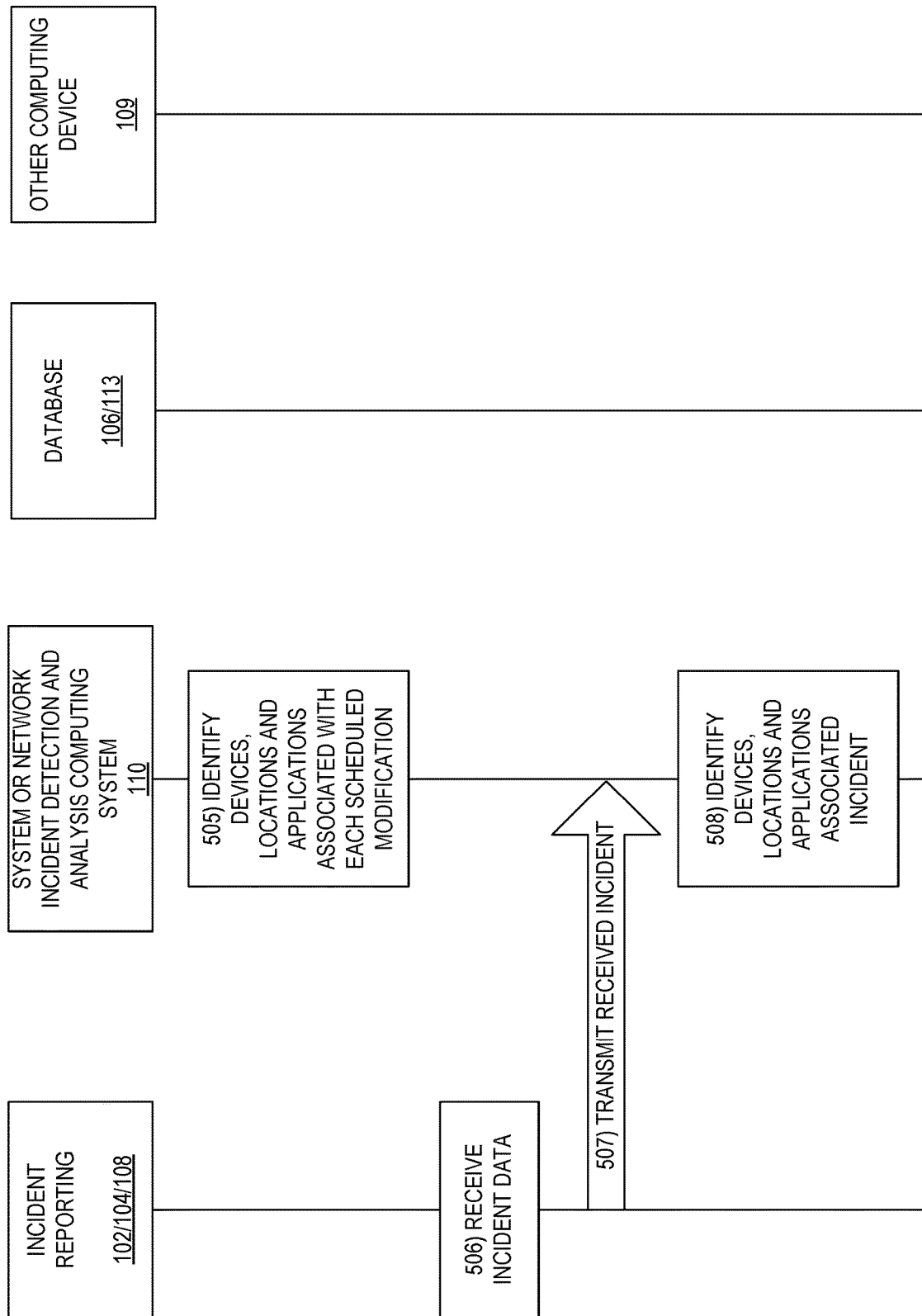

With reference to FIG. 5B, in step 505, the data associated with the scheduled modifications may be analyzed to identify systems, devices, networks, applications, and the like, that will be modified, as well as date and time at which the modification will occur.

In step 506, an incident may be received (e.g., by a user computing device 102, associate/call center computing device 104, or the like) or may be detected, such as by an automated incident reporting system 108. The incident may be transmitted to the system or network incident detection and analysis computing system 110 in step 507. In step 508, data associated with the incident may be analyzed (e.g., in real-time or near real-time) to identify an application, system, network, device, or the like, impacted by the incident or associated with the incident.

Figure 5C:
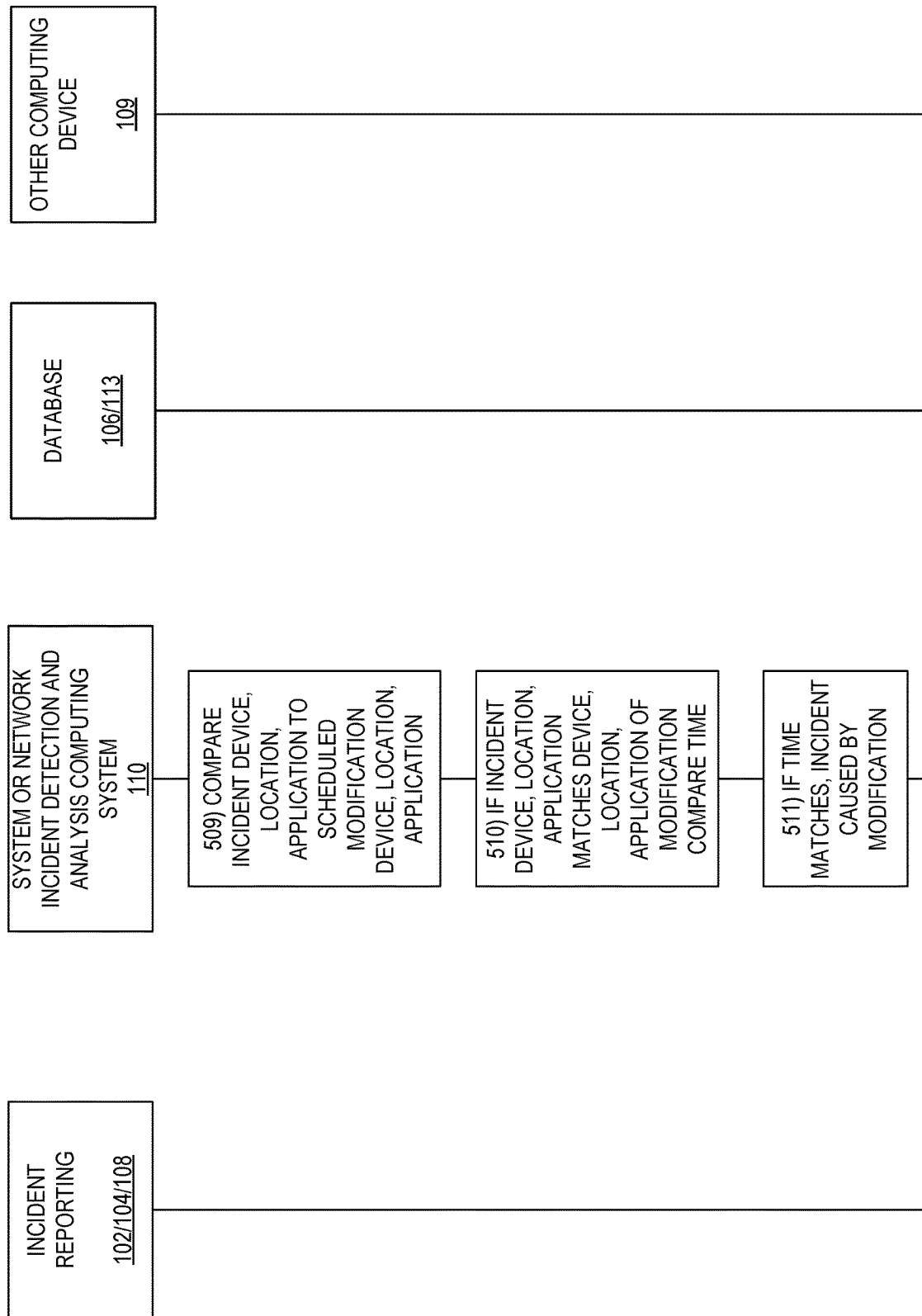

With reference to FIG. 5C, in step 509, the data extracted from the incident may be compared to the scheduled modification data to determine whether a scheduled modification occurred for the impacted application, system, network, device, or the like. If so, in step 510, the time and date associated with the incident may be compared to the time and date of the scheduled modification. If there is a match, a determination may be made that the scheduled modification caused the incident in step 511.

Figure 5D:
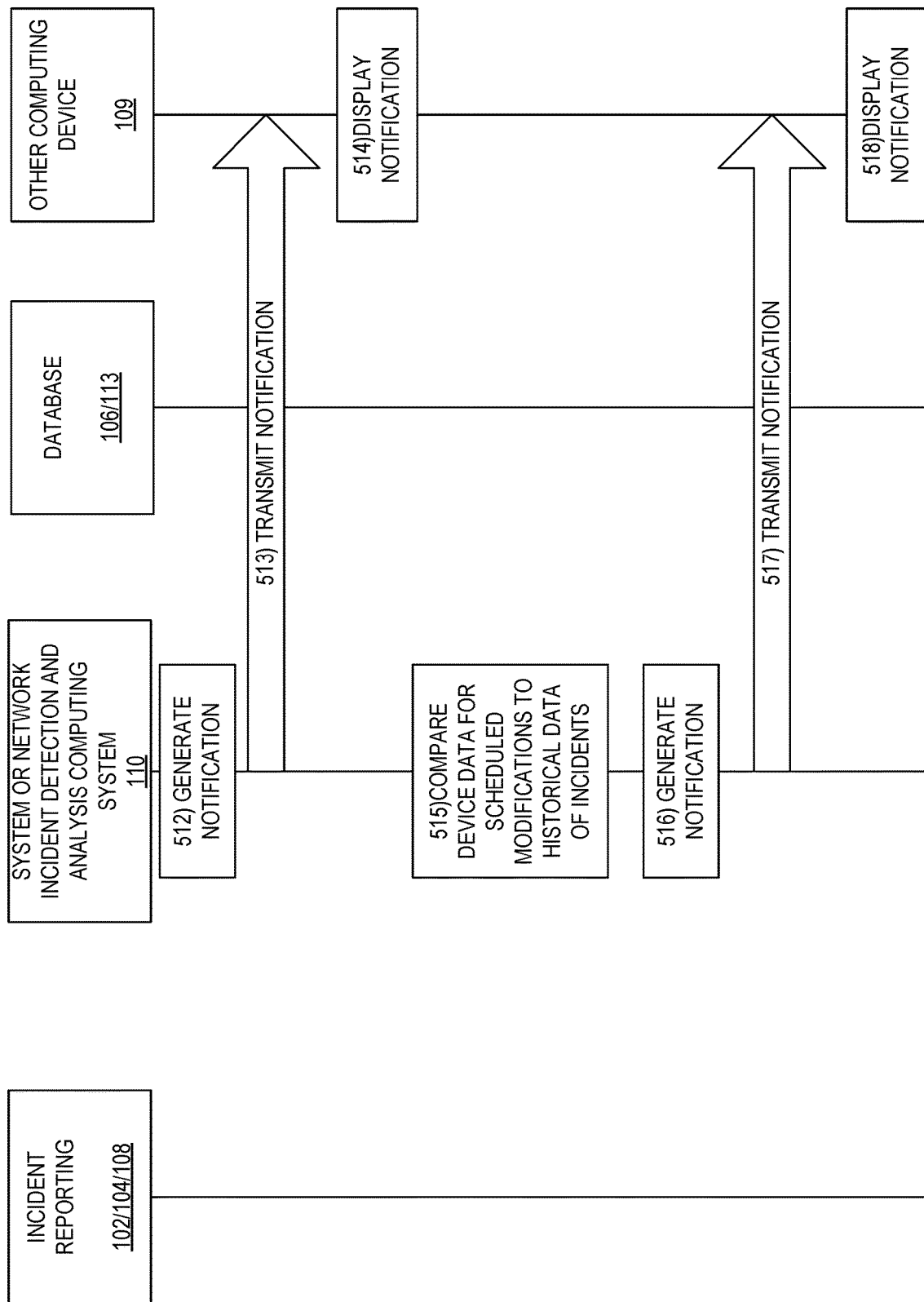

With reference to FIG. 5D, in step 512, one or more notifications may be generated indicating that the scheduled modification was a likely cause of the incident. The notification may be a user interface configured to display as a pop-up window in an application and/or may be an email or other message transmitted to particular users. In step 513, the generated notification may be transmitted to one or more computing devices. In step 514, the generated notification may be displayed on the one or more computing devices (e.g., the change management computing device may command, direct or cause the notification to be displayed).

The historical data (e.g., machine learning data set) and scheduled modification data may be used to proactively identify potential incidents that may have a significant business impact. In step 515, devices, systems, applications, and the like, associated with the scheduled modifications (and identified in step 505) may be compared to devices, systems, applications, and the like, identified in historical data associated with incidents having a significant business impact (e.g., from step 503). If a modification is scheduled for a same or substantially similar device, system, application, or the like, that was identified as having a previous incident with a significant business impact, one or more notifications may be generated in step 516. The notification may include a user interface displayed within an application and/or an email message transmitted to one or more users. The notification may indicate that an upcoming scheduled modification is likely to cause an incident and appropriate actions should be taken to avoid or mitigate impact of any incident.

In step 517, the notification may be transmitted to one or more other computing devices 109. In step 518, the notification may be displayed on the computing device 109.

Figure 6A:
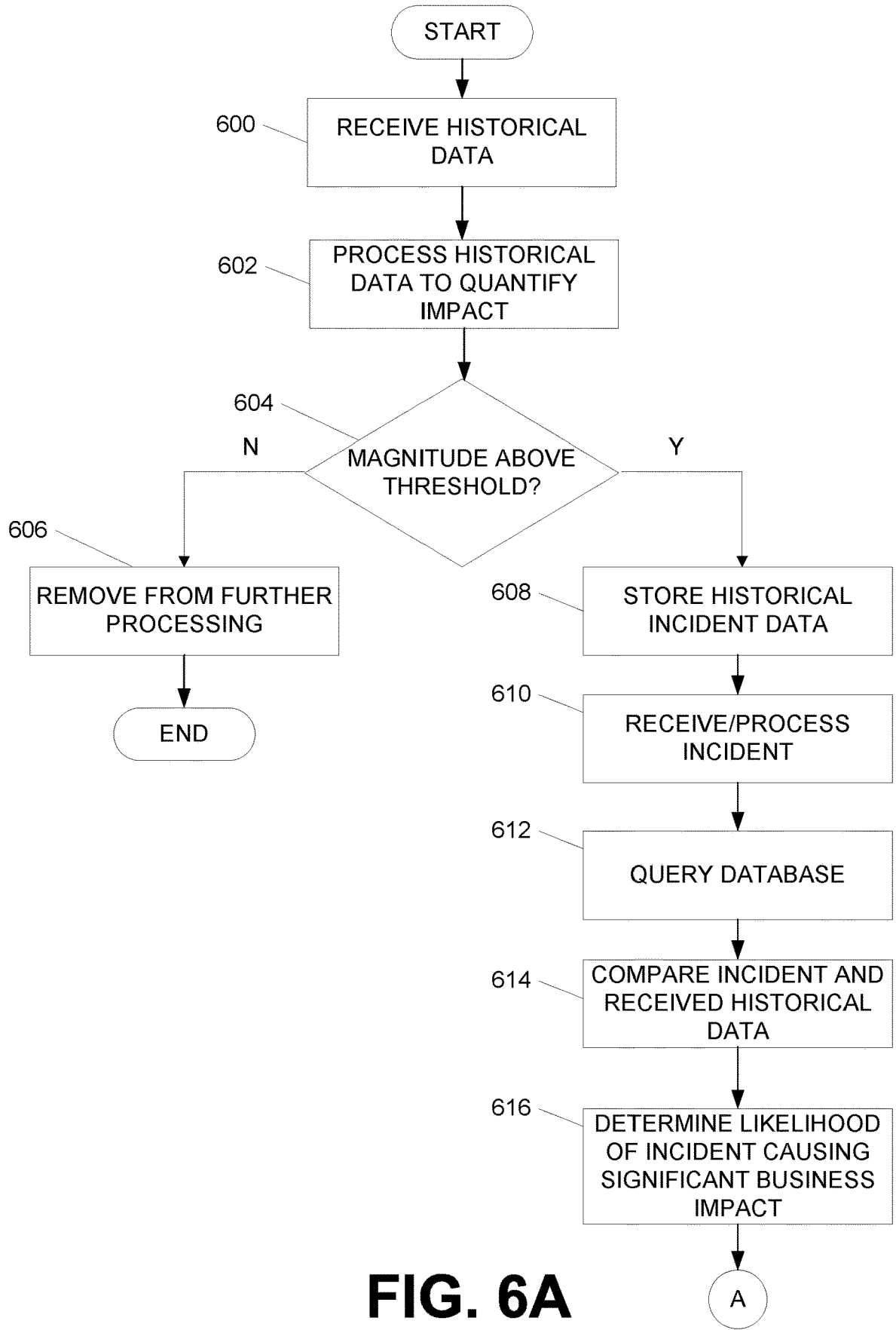
FIGS. 6A and 6B illustrate one example method of analyzing historical data to identify significant business impact incidents and evaluating newly detected incidents according to one or more aspects described herein.
Figure 6B:
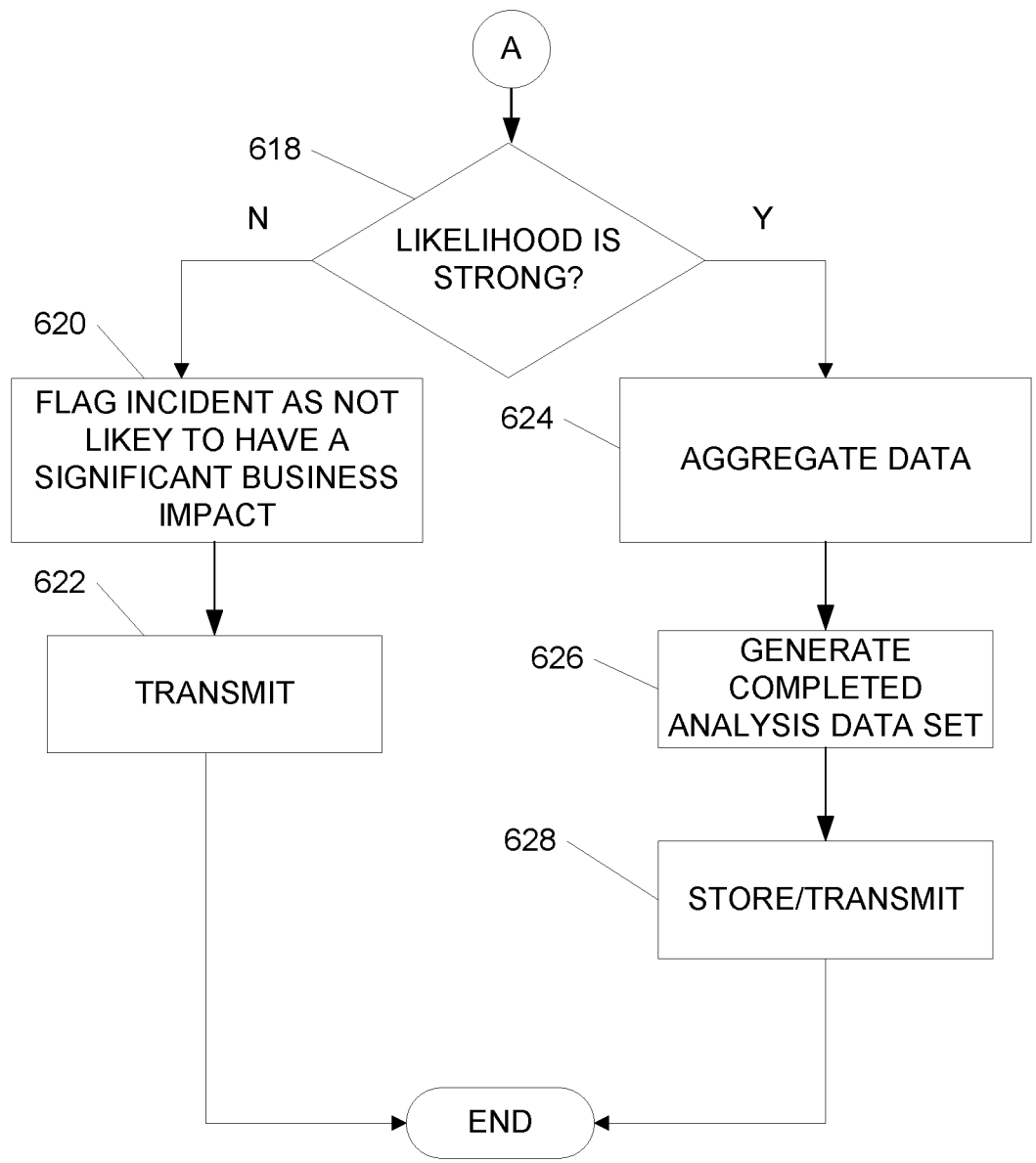

FIGS. 6A and 6B illustrate one example method of analyzing historical data to identify significant business impact incidents and evaluating, in real-time or near real-time, newly detected incidents according to one or more aspects described herein. In step 600, historical data may be received, such as by a pre-processing computing device 140 of a system, machine learning engine 180, and/or network incident detection and analysis computing system 110. In step 602, the pre-processing computing device 140 may process the received historical data to identify incidents that previously occurred and have been remedied and to quantify an impact or magnitude of an impact, e.g., a business impact, made by each incident. In some examples, the magnitude of the business impact may be determined using an impact matrix to evaluate urgency versus impact. In other examples, the magnitude of business impact may be based on or quantified by cost associated with the failure. For example, costs associated with failed customer interactions, people hours lost, and the like, may be used to quantify the business impact (e.g., after the incident has been resolved). In some examples, both an impact matrix and costs associated with the failure may be used.

In step 604, the impact or magnitude of each impact determined may be compared to a predetermined threshold. If, in step 604, the quantified impact or magnitude of impact is not at or above the predetermined threshold, the incident may be removed from further processing in step 606.

If, in step 604, the quantified impact or magnitude of the impact is at or above the predetermined threshold, the historical data may be stored in step 608. In step 610, an incident may be received. For example, a newly detected or received incident may be received by the pre-processing computing device 140, machine learning engine 180, and/or the system or network incident detection and analysis computing system 110.

In step 612, the pre-processing computing device 140 may query a database to retrieve historical incident data determined to have a significant business impact (e.g., quantified impact at or above the predetermined threshold). Querying the database may include providing as input data from the incident detected or received in step 610. For instance, the query may include a type of incident, system, application, network, device, location, or the like, impacted by the incident, or the like, to identify any similar incidents that previously occurred and had a significant business impact.

In step 614, the received incident may be compared to data retrieved from the database query. For example, the incident may be compared to the historical data (e.g., a machine learning data set) to determine whether the incident impacted the same system, network, device, application, or the like, occurred at a same or similar time or date to other incidents, and the like. In step 616, this information may be used to determine whether the incident is likely to cause a significant business impact.

With reference to FIG. 6B, in step 618, the determined likelihood may be evaluated to determine whether the determined likelihood is high. If, in step 618, the likelihood is not high (e.g., incident occurred at different time, to different system, or the like), the incident may be flagged in step 620 as not likely to cause a significant business impact and that result may be transmitted to one or more computing devices in step 622. Alternatively, if, in step 618, the likelihood is high, the incident data may be aggregated with historical data in step 624. In step 626, the aggregated data may be used to generate a completed analysis data set which may then be transmitted to one or more other computing devices for additional processing in step 628. In some examples, the completed analysis data set may also be stored in step 628.

Figure 7A:
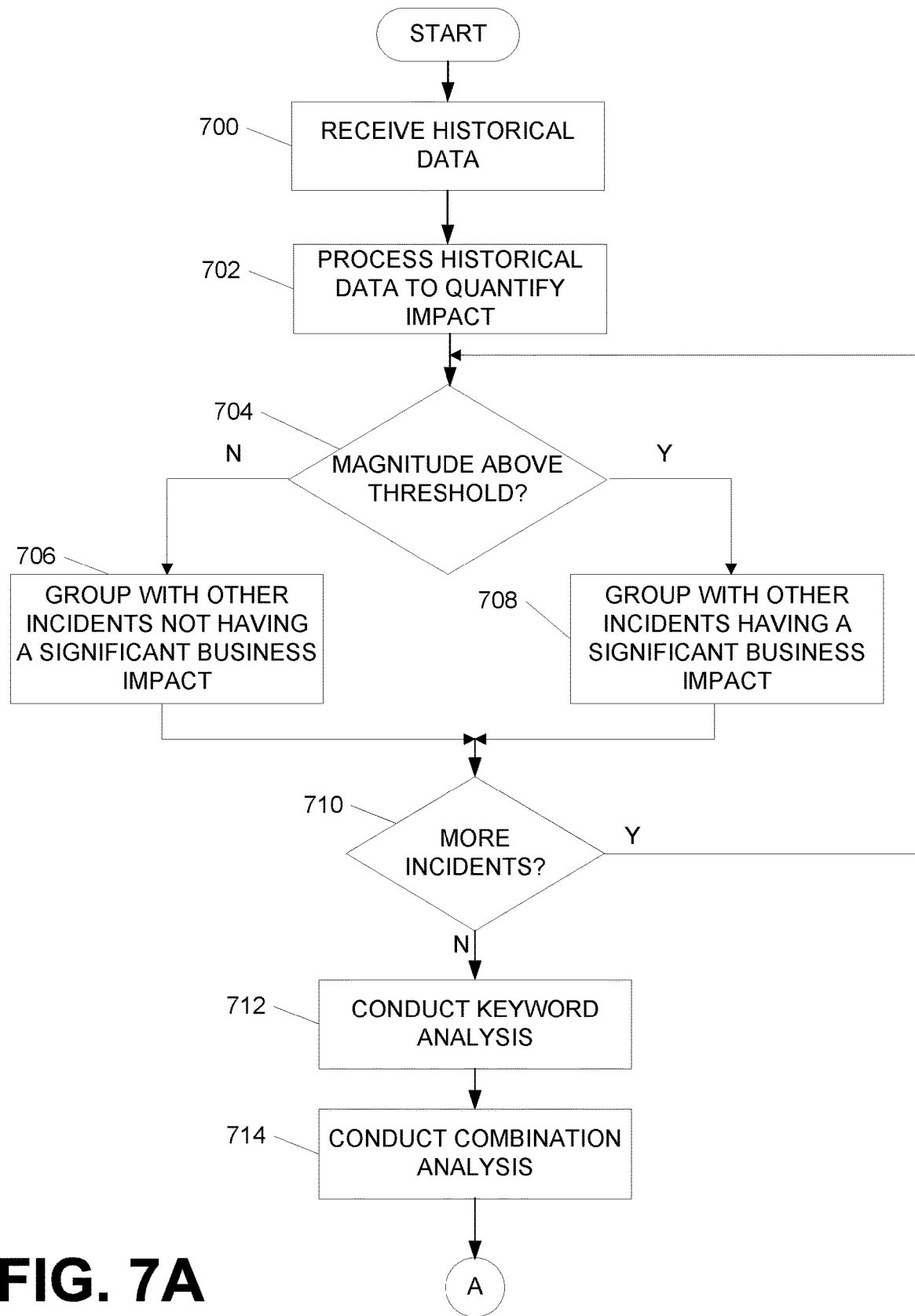
FIGS. 7A and 7B illustrate one example method of using textual analysis to identify incidents that may have a significant business impact according to one or more aspects described herein.
Figure 7B:
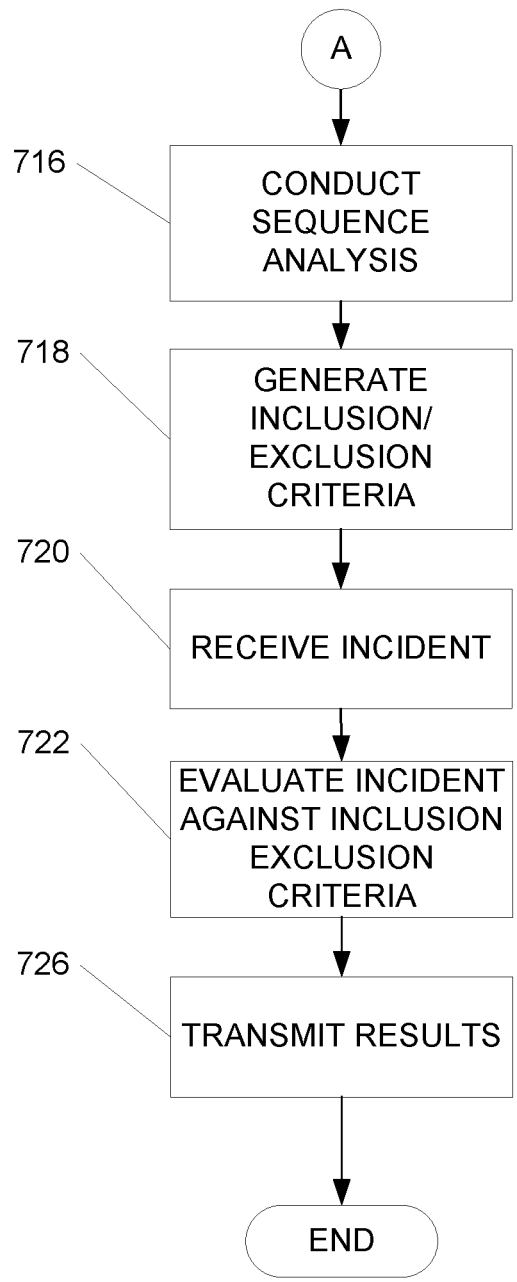

FIGS. 7A and 7B illustrate an example method of using textual analysis to identify incidents that may have a significant business impact, according to one or more aspects described herein. With reference to FIG. 7A, in step 700, historical data may be received. In step 702, the historical data may be processed to quantify an impact associated with each incident within the historical data. In step 704, a determination may be made as to whether an incident had a magnitude above a predetermined threshold. These steps may be similar to those described with respect to FIG. 6A, steps 600, 602, and 604. In some examples, one or more outputs (e.g., incidents identified as having a magnitude of impact above the predetermined threshold) from one or more steps of the process of FIG. 6A or 6B may be used here and steps 700, 702, and 704 may be omitted.

If, in step 704, the incident being evaluated is determined to not have an impact above the predetermined threshold, the incident may be grouped with other incidents (e.g., historical incidents) that also did not have a significant business impact in step 706. If, in step 704, the incident is determined to have a magnitude of impact at or above the threshold, the incident may be grouped with other incidents (e.g., historical incidents) having a significant business impact (e.g., impact at or above the threshold) in step 708.

In step 710, a determination may be made as to whether there are additional incidents to evaluate. If so, the process may return to step 704 to compare the magnitude of impact of another incident to the threshold. If not, the process may continue to step 712 and may conduct a keyword analysis on the group of incidents having a significant business impact (e.g., impact at or above threshold) and the group of incidents not having a significant business impact (e.g., impact below threshold). For each group of incidents, one or more keywords found in the incident (e.g., in free form text within the incident) may be identified.

In step 714, a keyword combination analysis may be performed. For instance, for the keywords identified in the group of incidents having a significant business impact, each combination of keywords may be evaluated to identify combinations of keywords having a strong correlation to an incident having a significant business impact. Similarly, for the keywords identified in the group of incidents not having a significant business impact, each combination of keywords may be evaluated to identify combinations of keywords having a strong correlation to incidents not having a significant business impact.

With reference to FIG. 7B, in step 716, a sequence analysis may be performed. For instance, the combinations identified for each of the two groups may be further analyzed to evaluate different sequences of keywords. For example, each sequence of keywords identified in the group of incidents having a significant business impact may be evaluated to identify sequences having a strong correlation to incidents having a significant business impact. Similarly, each sequence of keywords identified in the group of incidents not having a significant business impact may be evaluated to identify sequences having a strong correlation to incidents not having a significant business impact.

In step 718, the identified keywords, combinations and/or sequences may be used to identify inclusion and exclusion criteria (e.g., machine learning data set) to be used when evaluating incoming, newly detected or received incidents. For example, the keywords, combinations and/or sequences identified for the group of incidents having a significant business impact may be used to generate inclusion criteria or criteria that will be used to determine when to include a newly detected or received incident for further processing or for priority action (e.g., urgent response, resources allocated, and the like).

Similarly, the identified keywords, combinations and/or sequences identified for the group of incidents not having a significant business impact may be used to generate exclusion criteria that will be used to determine when to exclude a newly detected or received incident from further processing or from priority action (e.g., less urgent response, resources allocated, or the like).

In step 720, an incident may be detected or received. In step 722, the incident may be evaluated against the generated inclusion and exclusion criteria (e.g., compared to the machine learning data set) to determine whether to prioritize the incident. In some examples, data from the incident may be parsed to identify keywords which may be compared to the keywords, combinations and/or sequences of the inclusion and exclusion criteria. In step 724, the results of the evaluation may be transmitted to one or more computing devices (e.g., for further action or processing).

Figure 8:
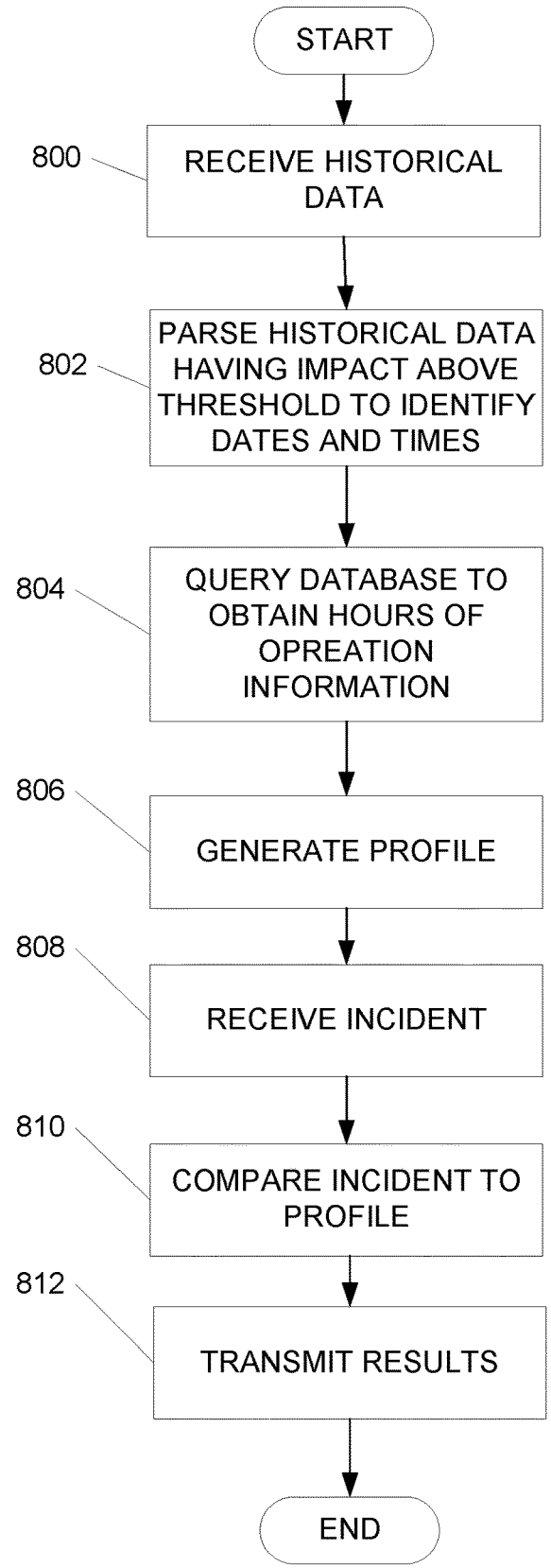
FIG. 8 illustrates one example method of evaluating a date and/or time of an incident to determine whether the incident is likely to cause a significant business impact, according to one or more aspects described herein.

FIG. 8 illustrates one example of evaluating a date and/or time of an incident to determine whether the incident is likely to cause a significant business impact, according to one or more aspects described herein. In step 800, historical data may be received. In some examples, the historical data received may be processed similar to steps 600, 602 and 604, and steps 700, 702, and 704. In other examples, the historical data received may be outputs from one or more of those processes and may only include incidents having a business impact above the predetermined threshold.

In step 802, the received historical incident data may be analyzed to identify a date and/or time at which the incident occurred. In step 804, one or more databases may be queried to obtain normal hours of operation data for a plurality of devices, systems, applications, networks, locations, or the like. For example, applications such as an online banking system may be available (or may have normal operating hours) of 24 hours per day, 7 days per week. However, a server or application used by a banking associate in a financial institution location, such as a branch, might have normal operating hours of 8:00 a.m. to 6:00 p.m. for the local time zone. Accordingly, an incident occurring outside of normal business hours might not have a significant business impact while the same incident occurring during normal business hours may have a significant business impact. Accordingly, the time and date of an incident may affect the impact.

In step 806, a profile may be generated for one or more systems, applications, networks, devices and/or locations. The profile may include normal hours of operation data, as well as data associated with incidents impacting the system, network, application, device, or the like.

In step 808, an incident may be received. The incident may be received from one or more devices or may be detected, as discussed more fully above. In step 810, the incident may be processed to identify a system, application, network, device, location, or the like, associated with the incident and the incident may then be compared to the profile for that system, application, network, device, location, or the like. Comparing the incident to the profile may include comparing a date and time at which the incident occurred to historical incidents occurring at a similar date and/or time to evaluate whether the incident is likely to cause a significant business impact (e.g., if it occurred at a same or similar date and/or time as one or more historical incidents having a significant business impact).

In step 812, the results of the comparison may be transmitted to one or more computing devices. For example, a notification may be generated and transmitted to one or more computing devices indicating that this incident is likely or not likely to cause a significant business impact.

Figure 9A:
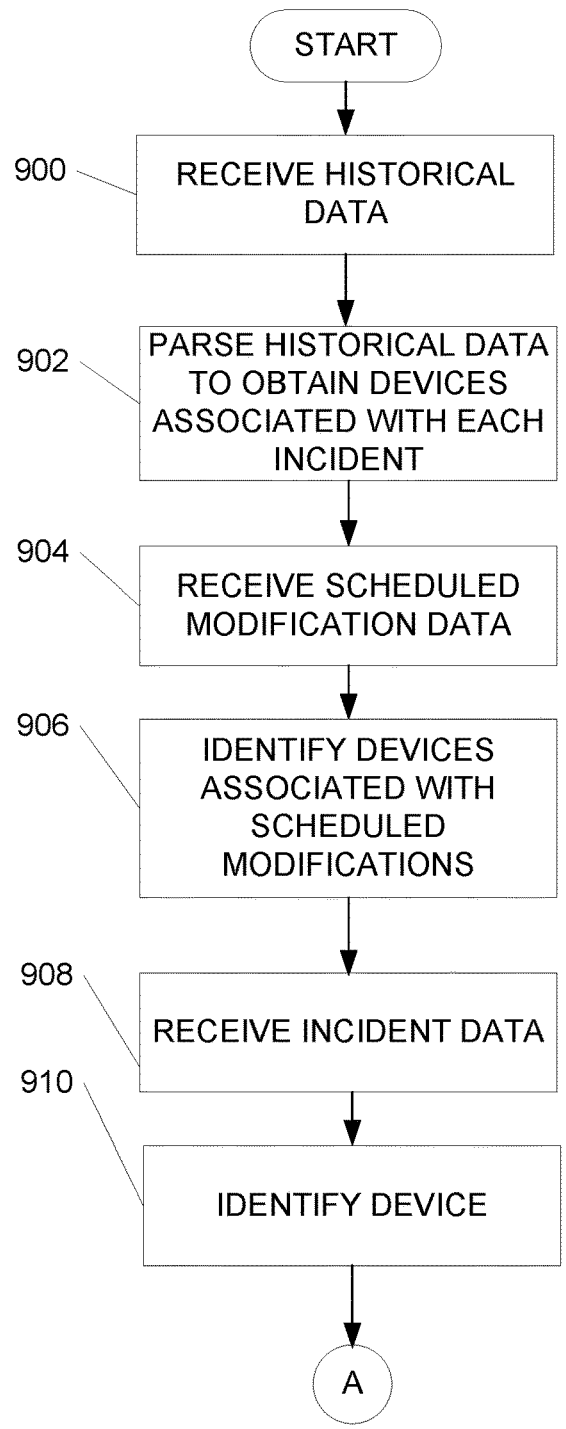
FIGS. 9A and 9B illustrate one example method of analyzing scheduled modifications to evaluate a likely cause of an incident, according to one or more aspects described herein.
Figure 9B:
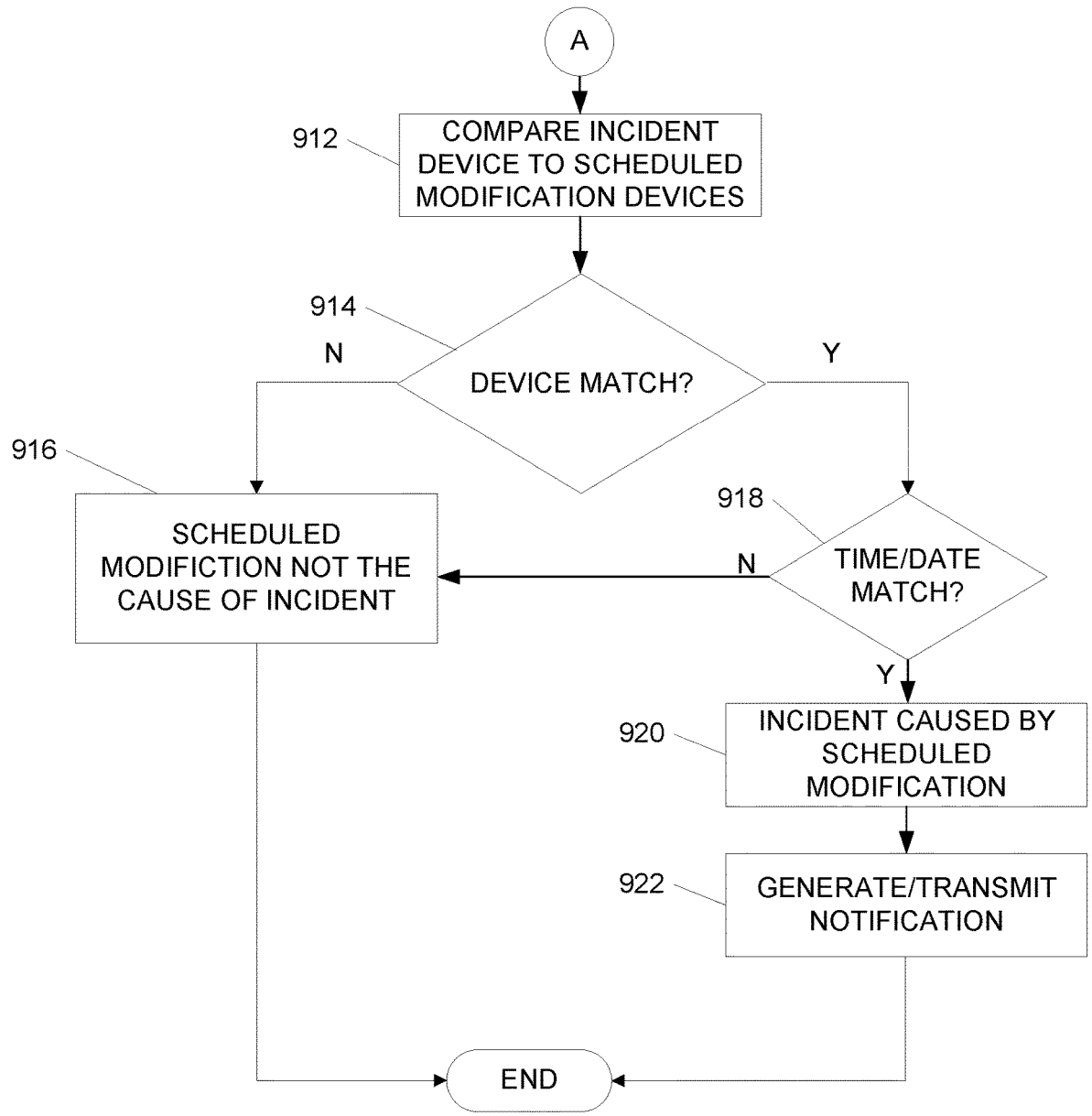

FIGS. 9A and 9B illustrate one example method of analyzing scheduled modifications to evaluate a likely cause of an incident according to one or more aspects described herein. With reference to FIG. 9A, at step 900, historical data may be received. In some examples, the historical data may be processed to identify incidents having a significant business impact. In other examples, the historical data received may be pre-processed such that incidents having a significant business impact are already identified.

In step 902, the historical data may be analyzed to identify one or more systems, networks, applications, devices, locations, or the like, associated with each incident in the historical data. In step 904, scheduled modification data may be received. For example, one or more scheduled modifications, such as system updates, device/hardware replacement, upgrades, or the like, may be received. The data received associated with the scheduled modifications may include data associated with the system, application, network, device, location, or the like, as well as time and date of the scheduled modification, type of modification, and the like.

In step 906, the data associated with the scheduled modifications may be processed to identify each system, application, network, device, location, or the like, for which a modification is scheduled or is ongoing.

In step 908, an incident may be detected or received. The incident may include data associated with the incident, such as an affected system, network, application, device, or the like, as well as a time and date of the incident. In step 910, a device, system, application, or the like, associated with the incident may be extracted from the data.

With reference to FIG. 9B, in step 912, the incident device (or other item impacted by the incident) may be compared to the one or more systems, applications, networks, devices identified from the scheduled modification data. In step 914, a determination may be made as to whether the device matches. If not, the scheduled modification may be flagged as not the cause of the incident in step 916.

If, in step 914, the device matches, in step 916, a determination may be made as to whether a time and date of the scheduled modification matches the time and date of the incident. This determination may include determining whether a time and date fall within a time period during which the scheduled modification is performed. If the time and date do not match in step 916, the modification may be flagged as not the cause of the incident in step 916.

If the time and date do match (or if the time and date of the incident fall within a range of time during which the scheduled modification is being implemented), the scheduled modification may be identified as the cause of the incident in step 920. In step 922, a notification may be generated indicating that the scheduled modification is the cause of the incident and that it is likely to cause a significant business impact. The notification may then be transmitted to one or more computing devices.

Figure 10:
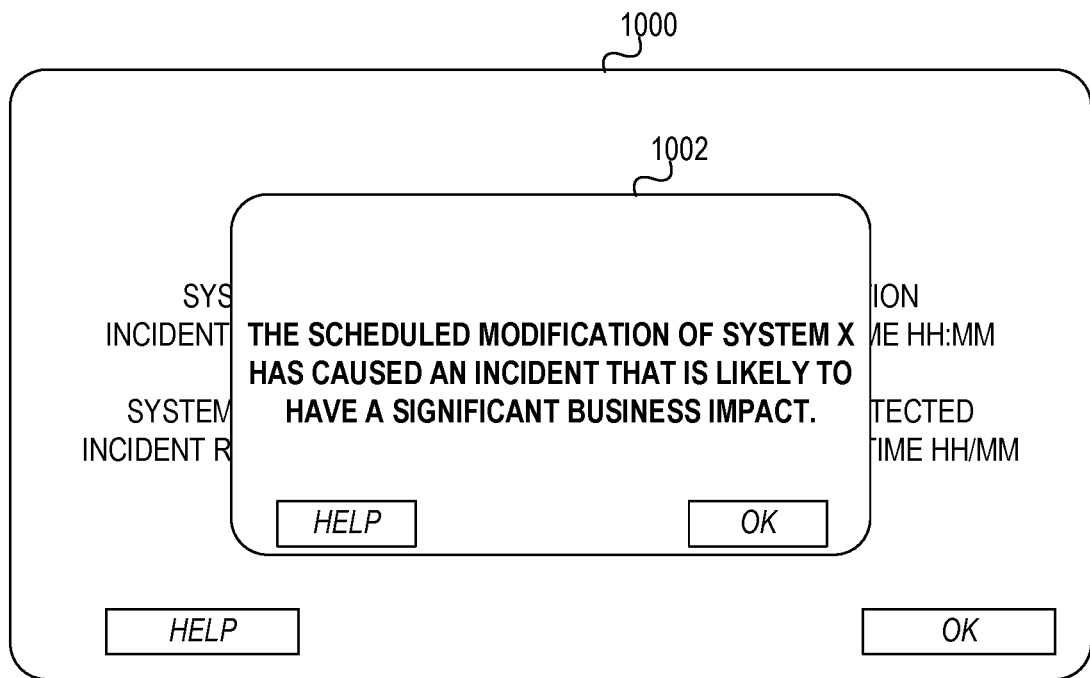
FIG. 10 illustrates one example user interface including a notification according to one or more aspects described herein.

FIG. 10 illustrates one example user interface including a notification according to one or more aspects described herein. The user interface 1000 may include a second interface 1002 overlaying another interface (e.g., a pop-up window). The second interface 1002 may include a notification that a scheduled modification is the cause of an incident that is likely to have a significant business impact. The interface 1002 may include additional information related to the incident (e.g., type of incident, systems, applications, or the like, impacted, time and date of incident, and the like). The system or network incident detection and analysis computing system 110 may generate the notification, may transmit it to one or more computing devices and may command or cause the interface 1002 to be displayed on the one or more computing devices.

Figure 11:
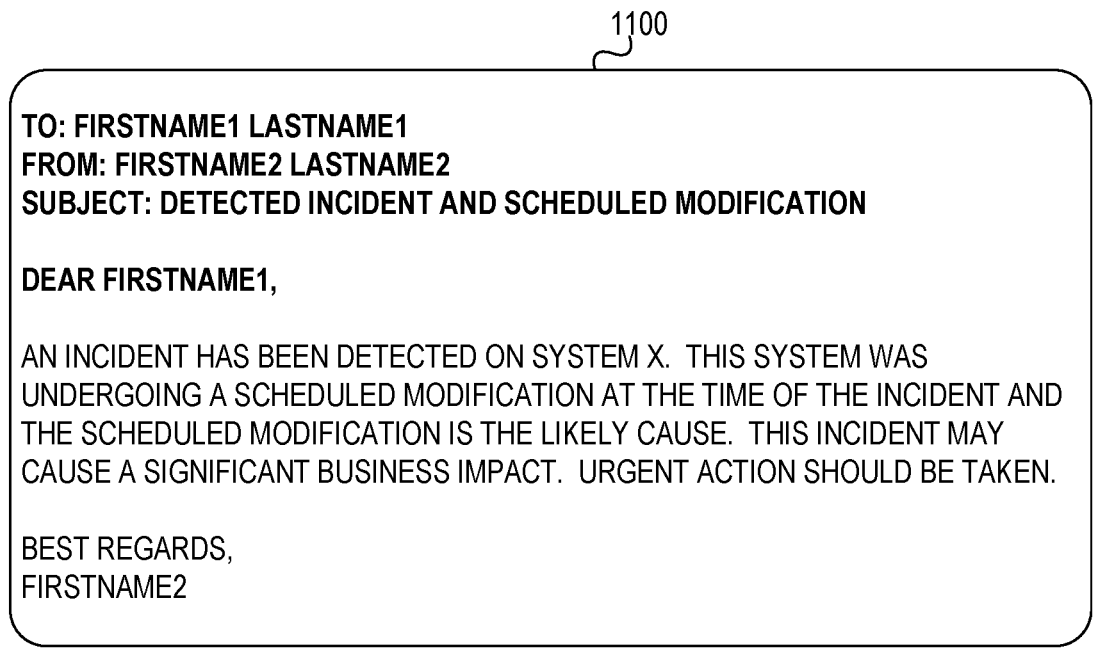
FIG. 11 illustrates another example notification according to one or more aspects described herein.

FIG. 11 illustrates another example notification according to one or more aspects described herein. FIG. 11 includes an email message that may be transmitted to one or more users. In some examples, the recipients of the email message may be identified based on a type of incident, type of system or application impacted, or the like. The email message may include information related to the incident, an indication that it was caused by a scheduled modification and the like. Although an email message is shown in FIG. 11, various other types of messages may be used to transmit the notification, such as SMS, or the like.

Although the notifications shown in FIGS. 10 and 11 are directed to incidents caused by scheduled modifications, one or more similar notifications may be generated and displayed on one or more computing devices to alert a user to other issues, as discussed more fully herein.

As discussed herein, aspects of the arrangements described provide for using machine learning to efficiently and accurately identify, in real-time or near real-time, incidents that are likely to cause a significant business impact and aid in prioritizing resources to address one or more incidents. As discussed above, the use of machine learning to evaluate historical data and identify previous incidents that had a significant business impact may aid in permitted far more incidents to be evaluated in a less time consuming manner than conventional systems. Accordingly, incidents likely to cause a significant business impact may be identified more quickly and action to remedy the incident may be implemented more quickly in order to mitigate impact of the incident. Resources including employees, monetary resources, and the like, may also be appropriately allocated to incidents likely to cause a significant business impact and therefore should be prioritized.

In addition, as discussed above, the use of textual and temporal analysis may further increase the accuracy of identifying incidents as likely to cause a significant business impact. By evaluating free form text to identify keywords, combinations of keywords, and/or sequences of keywords the arrangements described allow for accurate identification of incidents similar to historical incidents that had a significant business impact.

Further, by evaluating each incident based on a time and date of occurrence, the system can account for variations in potential impact due to incidents being during or outside of normal business hours, incidents occurring on a week in which many transactions are being processed (e.g., a payroll week), incidents occurring on a holiday or near a holiday, or the like.

Further still, evaluating scheduled modifications to aid in determining a cause of an incident may aid in reducing impact of incident by more quickly identifying a cause and allocating resources to address the incident. In addition, comparing scheduled modification data to devices that previously had a significant business impact incident may aid in proactively identifying potential incidents and taking action to reduce or eliminate impact of a potential incident.

Figure 12:
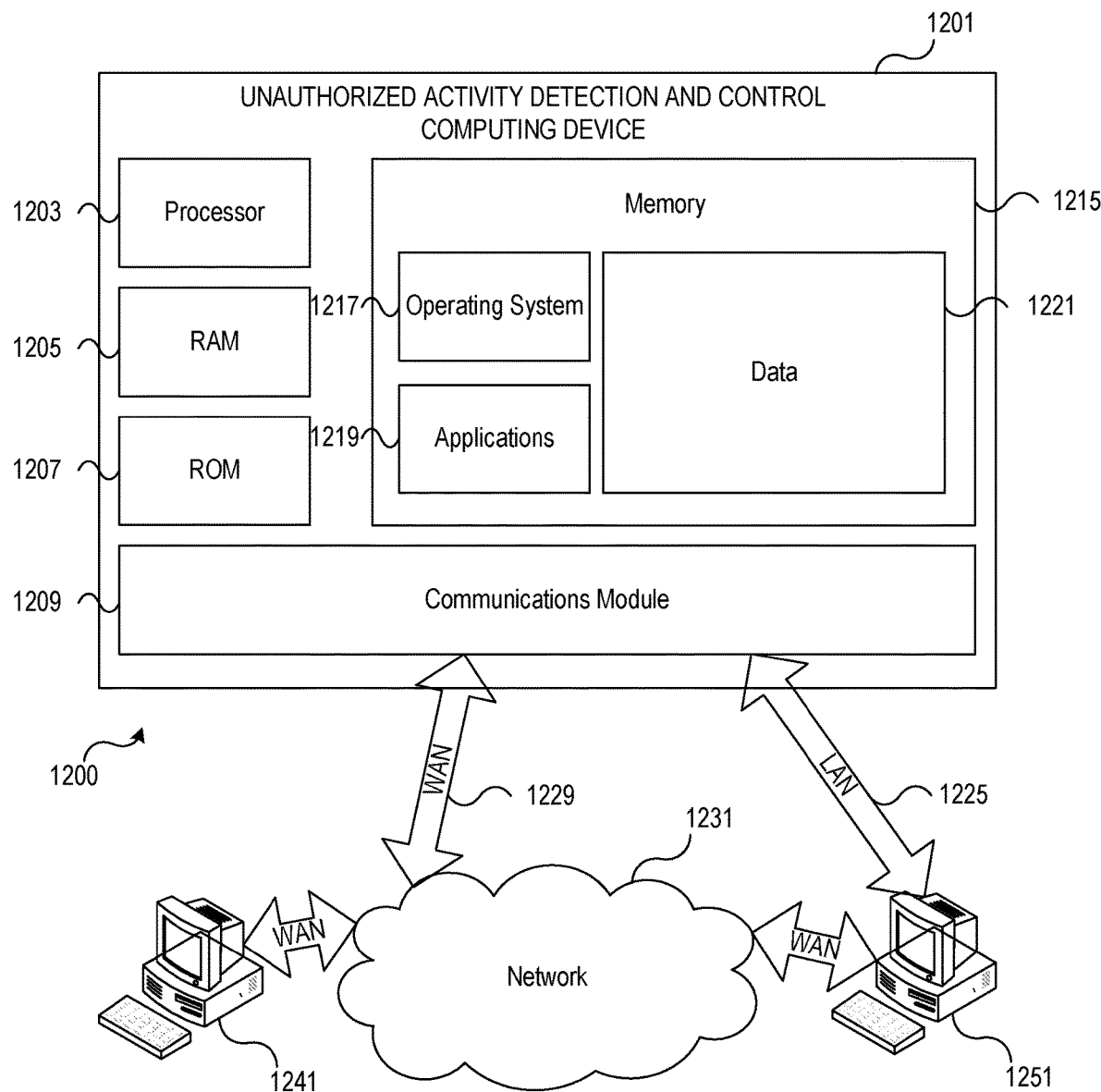
FIG. 12 illustrates one example operating environment in which various aspects of the disclosure may be implemented in accordance with one or more aspects described herein.

FIG. 12 depicts an illustrative operating environment in which various aspects of the present disclosure may be implemented in accordance with one or more example embodiments. Referring to FIG. 12, computing system environment 1200 may be used according to one or more illustrative embodiments. Computing system environment 1200 is only one example of a suitable computing environment and is not intended to suggest any limitation as to the scope of use or functionality contained in the disclosure. Computing system environment 1200 should not be interpreted as having any dependency or requirement relating to any one or combination of components shown in illustrative computing system environment 1200.

Computing system environment 1200 may include system or network incident detection and analysis computing device 1201 having processor 1203 for controlling overall operation of system or network incident detection and analysis computing device 1201 and its associated components, including random-access memory (RAM) 1205, read-only memory (ROM) 1207, communications module 1209, and memory 1215. System or network incident detection and analysis computing device 1201 may include a variety of computer readable media. Computer readable media may be any available media that may be accessed by system or network incident detection and analysis computing device 1201, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 1201.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on system or network incident detection and analysis computing device 1201. Such a processor may execute computer-executable instructions stored on a computer-readable medium.

Software may be stored within memory 1215 and/or storage to provide instructions to processor 1203 for enabling system or network incident detection and analysis computing device 1201 to perform various functions. For example, memory 1215 may store software used by system or network incident detection and analysis computing device 1201, such as operating system 1217, application programs 1219, and associated database 1221. Also, some or all of the computer executable instructions for system or network incident detection and analysis computing device 1201 may be embodied in hardware or firmware. Although not shown, RAM 1205 may include one or more applications representing the application data stored in RAM 1205 while system or network incident detection and analysis computing device 1201 is on and corresponding software applications (e.g., software tasks) are running on system or network incident detection and analysis computing device 1201.

Communications module 1209 may include a microphone, keypad, touch screen, and/or stylus through which a user of system or network incident detection and analysis computing device 1201 may provide input, and may also include one or more of a speaker for providing audio output and a video display device for providing textual, audiovisual and/or graphical output. Computing system environment 1200 may also include optical scanners (not shown). Exemplary usages include scanning and converting paper documents, e.g., correspondence, receipts, and the like, to digital files.

System or network incident detection and analysis computing device 1201 may operate in a networked environment supporting connections to one or more remote computing devices, such as computing devices 1241 and 1251. Computing devices 1241 and 1251 may be personal computing devices or servers that include any or all of the elements described above relative to system or network incident detection and analysis computing device 1201.

The network connections depicted in FIG. 12 may include local area network (LAN) 1225 and wide area network (WAN) 1229, as well as other networks. When used in a LAN networking environment, system or network incident detection and analysis computing device 1201 may be connected to LAN 1225 through a network interface or adapter in communications module 1209. When used in a WAN networking environment, system or network incident detection and analysis computing device 1201 may include a modem in communications module 1209 or other means for establishing communications over WAN 1229, such as network 1231 (e.g., public network, private network, Internet, intranet, and the like). The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 13:
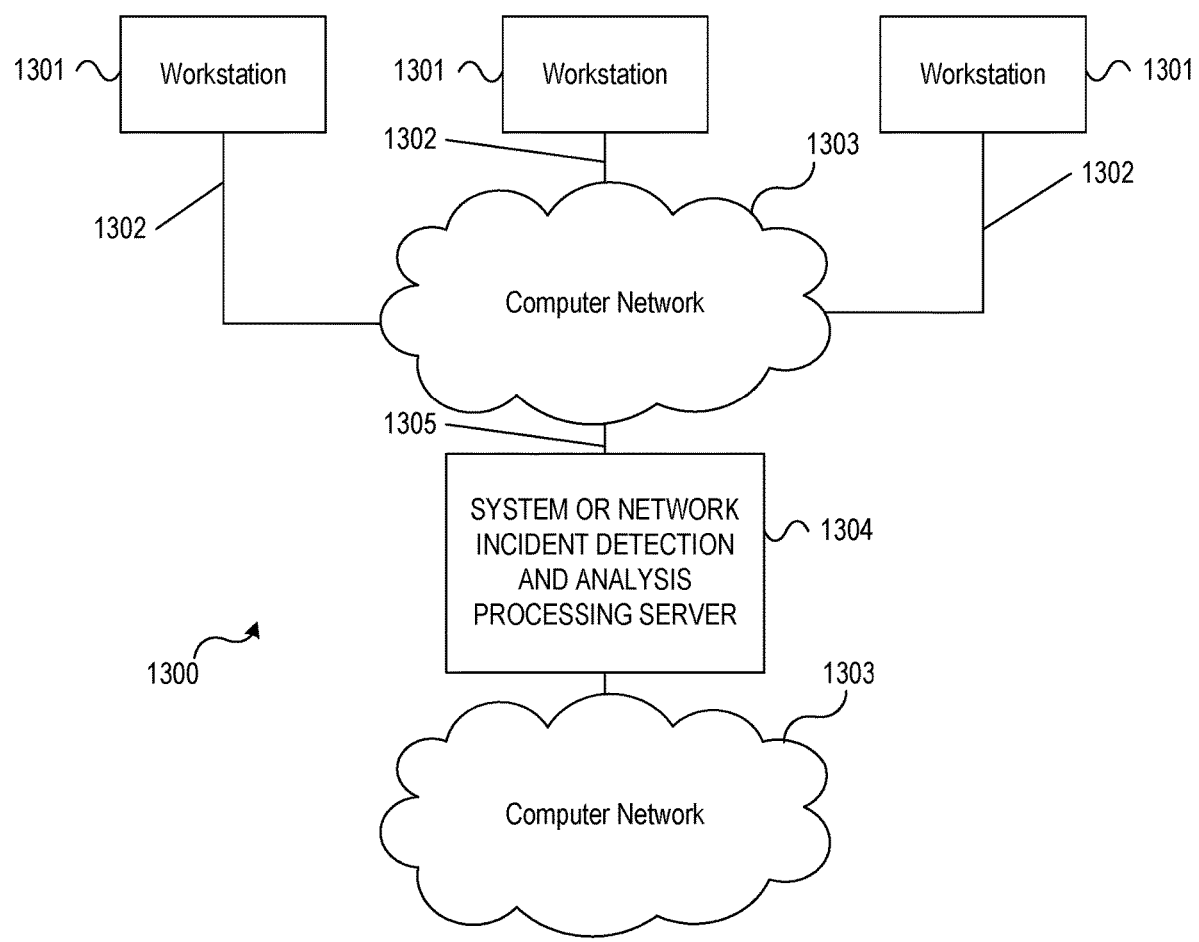
FIG. 13 depicts an illustrative block diagram of workstations and servers that may be used to implement the processes and functions of certain aspects of the present disclosure in accordance with one or more aspects described herein.

FIG. 13 depicts an illustrative block diagram of workstations and servers that may be used to implement the processes and functions of certain aspects of the present disclosure in accordance with one or more example embodiments. Referring to FIG. 13, illustrative system 1300 may be used for implementing example embodiments according to the present disclosure. As illustrated, system 1300 may include one or more workstation computers 1301. Workstation 1301 may be, for example, a desktop computer, a smartphone, a wireless device, a tablet computer, a laptop computer, and the like, configured to perform various processes described herein. Workstations 1301 may be local or remote, and may be connected by one of communications links 1302 to computer network 1303 that is linked via communications link 1305 to system or network incident detection and analysis processing server 1304. In system 1300, system or network incident detection and analysis processing server 1304 may be any suitable server, processor, computer, or data processing device, or combination of the same, configured to perform the functions and/or processes described herein. Server 1304 may be used to process the instructions received from one or more devices, detect incidents, analyze historical data, determine a likely impact of an incident, and the like.

Computer network 1303 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1302 and 1305 may be any communications links suitable for communicating between workstations 1301 and system or network incident detection and analysis processing server 1304, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers, systems, or platforms and one or more networks. The functionality may be distributed in any manner, or may be located in a single computing device (e.g., a server, a client computer, and the like), or across multiple computing devices. In such arrangements, any and/or all of the above-discussed communications between modules of the computing systems, devices, and the like may correspond to data being accessed, moved, modified, updated, and/or otherwise used by the single computing device, system, and the like. Additionally or alternatively, one or more of the computing devices systems, and the like, discussed above may be implemented in one or more virtual machines that are provided by one or more physical computing devices. In such arrangements, the various functions of each computing system, device, and the like, may be performed by the one or more virtual machines, and any and/or all of the above-discussed communications between computing devices may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure. Further, one or more steps or processed discussed with respect to one figure or arrangement may be used in combination with processes in other figures or arrangements without departing from the invention.

What is claimed is:

1. A system or network incident detection and analysis computing system, comprising:
    at least one processor;
    a communication interface communicatively coupled to the at least one processor; and
    at least one memory storing computer-readable instructions that, when executed by the at least one processor, cause a change management computing device of the system or network detection identification analysis computing system to:
        receive historical data including data related to incidents associated with a system or network and determined to have a quantified business impact above a predetermined threshold;
        process the received historical data;

identify, based on the processed historical data, at least one of: devices and applications associated with each incident and a time and date of each incident;

generate, based on the processed historical data, one or more machine learning datasets including inclusion criteria and exclusion criteria, the inclusion criteria and exclusion criteria being generated based on analysis of keywords and sequences of keywords in the historical data;

receive scheduled system or network modification data, the modification data including a date and time associated with each scheduled modification and at least one of a device and application to which the scheduled modification is being applied;

process the received scheduled system or network modification data to identify the at least one of: devices and applications for which a modification is scheduled;

receive incident data associated with an incident associated with at least one of: a device or application, the incident data including a date and time of the incident, free form text associated with the incident, and an identification of the device or application impacted by the incident;

analyze the received incident data including the free form text associated with the incident using the generated one or more machine learning datasets to determine whether the incident data matches inclusion criteria or exclusion criteria;

responsive to determining that the incident data matches exclusion criteria, process the incident as a low priority incident;

responsive to determining that the incident data matches inclusion criteria, processing the incident as a high priority incident including:
  comparing the received incident data to the scheduled system or network modification data to determine whether a modification was scheduled for the at least one of: the device or application;
  responsive to determining that a modification was scheduled for the at least one of: the device or application associated with the incident, comparing the date and time of the incident to a date and time associated with the scheduled modification for the at least on of: the device or application associated with the incident;
  responsive to determining that the date and time of the incident match a date and time of the scheduled modification, identifying the scheduled modification as a cause of the incident; and
  transmitting a notification indicating the scheduled modification was the cause of the incident; and update the one or more machine learning datasets based on the processing the incident.

2. The system or network incident detection and analysis computing system of claim 1, wherein the notification is transmitted to one or more user computing devices.

3. The system or network incident detection and analysis computing system of claim 1, wherein the notification includes a user interface including an alert associated with the modification.

4. The system or network incident detection and analysis computing system of claim 3, wherein the user interface is displayed on a display associated with a user computing device.

5. The system or network incident detection and analysis computing system of claim 1, wherein the notification includes an email message including a description of the incident.

6. The system or network incident detection and analysis computing system of claim 5, wherein the email is transmitted to a predetermined list of recipients based on a type of incident and a priority of incident.

7. The system or network incident detection and analysis computing system of claim 1, further including determining a confidence level that the modification was the cause of the incident.

8. A method, comprising:
  receiving, by a system or network incident detection and analysis computing system, historical data including data related to incidents associated with a system or network and determined to have a quantified business impact above a predetermined threshold;
  processing, by the system or network incident detection and analysis computing system, the received historical data;
  identifying, by the system or network incident detection and analysis computing system, at least one of: devices and applications associated with each incident and a time and date of each incident;
  generating, by the system or network incident detection and analysis computing system and based on the processed historical data, one or more machine learning datasets including inclusion criteria and exclusion criteria, the inclusion criteria and exclusion criteria being generated based on analysis of keywords and sequences of keywords in the historical data;
  receiving, by the system or network incident detection and analysis computing system, scheduled system or network modification data, the modification data including a date and time associated with each scheduled modification and at least one of a device and application to which the scheduled modification is being applied;
  processing, by the system or network incident detection and analysis computing system, the received scheduled system or network modification data to identify the at least one of: devices and applications for which a modification is scheduled;
  receiving, by the system or network incident detection and analysis computing system, incident data associated with an incident associated with at least one of: a device or application, the incident data including a date and time of the incident, free form text associated with the incident, and an identification of the device or application impacted by the incident;
  analyzing, by the system or network incident detection and analysis computing system, the received incident data including the free form text associated with the incident using the generated one or more machine learning datasets to determine whether the incident data matches inclusion criteria or exclusion criteria;
  responsive to determining that the incident data matches exclusion criteria, processing, by the system or network incident detection and analysis computing system, the incident as a low priority incident;
  responsive to determining that the incident data matches inclusion criteria, processing, by the system or network incident detection and analysis computing system, the incident as a high priority incident including:
    comparing, by the system or network incident detection and analysis computing system, the received incident data to the scheduled system or network modification data to determine whether a modification was scheduled for the at least one of: the device or application;
responsive to determining that a modification was scheduled for the at least one of: the device or application associated with the incident, comparing, by the system or network incident detection and analysis computing system, the date and time of the incident to a date and time associated with the scheduled modification for the at least one of: the device or application associated with the incident;
responsive to determining that the date and time of the incident match a date and time of the scheduled modification, identifying, by the system or network incident detection and analysis computing system, the scheduled modification as a cause of the incident; and
transmitting, by the system or network incident detection and analysis computing system, a notification indicating the scheduled modification was the cause of the incident; and
updating, by the system or network incident detection and analysis computing system, the one or more machine learning datasets based on the processing the incident.

9. The method of claim 8, wherein the notification is transmitted to one or more user computing devices.

10. The method of claim 8, wherein the notification includes a user interface including an alert associated with the modification.

11. The method of claim 10, wherein the user interface is displayed on a display associated with a user computing device.

12. The method of claim 8, wherein the notification includes an email message including a description of the incident.

13. The method of claim 12, wherein the email is transmitted to a predetermined list of recipients based on a type of incident and a priority of the incident.

14. The method of claim 8, further including determining a confidence level that the modification was the cause of the incident.

15. One or more non-transitory computer-readable media storing instructions that, when executed by at least one computer system comprising at least one processor, memory, and a communication interface, cause the at least one computer system to:
receive historical data including data related to incidents associated with a system or network and determined to have a quantified business impact above a predetermined threshold;
process the received historical data;
identify, based on the processed historical data, at least one of: devices and applications associated with each incident and a time and date of each incident;
generate, based on the processed historical data, one or more machine learning datasets including inclusion criteria and exclusion criteria, the inclusion criteria and exclusion criteria being generated based on analysis of keywords and sequences of keywords in the historical data;
receive scheduled system or network modification data, the modification data including a date and time associated with each scheduled modification and at least one of a device and application to which the scheduled modification is being applied;
process the received scheduled system or network modification data to identify the at least one of: devices and applications for which a modification is scheduled;
receive incident data associated with an incident associated with at least one of: a device or application, the incident data including a date and time of the incident, free form text associated with the incident, and an identification of the device or application impacted by the incident;
analyze the received incident data including the free form text associated with the incident using the generated one or more machine learning datasets to determine whether the incident data matches inclusion criteria or exclusion criteria;
responsive to determining that the incident data matches exclusion criteria, process the incident as a low priority incident;
responsive to determining that the incident data matches inclusion criteria, processing the incident as a high priority incident including:
compare the received incident data to the scheduled system or network modification data to determine whether a modification was scheduled for the at least one of: the device or application;
responsive to determining that a modification was scheduled for the at least one of: the device or application associated with the incident, comparing the date and time of the incident to a date and time associated with the scheduled modification for the at least on of: the device or application associated with the incident;
responsive to determining that the date and time of the incident match a date and time of the scheduled modification, identifying the scheduled modification as a cause of the incident; and
transmitting a notification indicating the scheduled modification was the cause of the incident; and
update the one or more machine learning datasets based on the processing the incident.

16. The one or more non-transitory computer-readable media of claim 15, wherein the notification is transmitted to one or more user computing devices.

17. The one or more non-transitory computer-readable media of claim 15, wherein the notification includes a user interface including an alert associated with the modification.

18. The one or more non-transitory computer-readable media of claim 17, wherein the user interface is displayed on a display associated with a user computing device.

19. The one or more non-transitory computer-readable media of claim 15, wherein the notification includes an email message including a description of the incident.

20. The one or more non-transitory computer-readable media of claim 19, wherein the email is transmitted to a predetermined list of recipients based on a type of incident and a priority of the incident.

21. The one or more non-transitory computer-readable media of claim 15, further including determining a confidence level that the modification was the cause of the incident.

* * * * *